United States Patent
Murali et al.

(10) Patent No.: US 8,971,210 B1
(45) Date of Patent: Mar. 3, 2015

(54) RECONFIGURABLE MULTI-STREAM PROCESSOR FOR MULTIPLE-INPUT MULTIPLE-OUTPUT (MIMO) WIRELESS NETWORKS

(75) Inventors: Partha Sarathy Murali, San Jose, CA (US); Logeshwaran Vijayan, Channai (IN)

(73) Assignee: Redpine Signals, Inc., San Jose, CA (US)

( * ) Notice: Subject to any disclaimer, the term of this patent is extended or adjusted under 35 U.S.C. 154(b) by 781 days.

(21) Appl. No.: 13/114,009

(22) Filed: May 23, 2011

(51) Int. Cl.
*H04L 12/28* (2006.01)
*H04B 10/10* (2006.01)
*H04W 84/12* (2009.01)
*H04B 7/04* (2006.01)
*H04L 7/04* (2006.01)

(52) U.S. Cl.
CPC ............. *H04W 84/12* (2013.01); *H04B 7/0413* (2013.01); *H04L 7/042* (2013.01)
USPC ........... 370/254; 370/256; 370/332; 370/343; 370/329; 370/338; 375/231; 375/232; 375/260; 375/267; 375/344; 455/101

(58) Field of Classification Search
CPC .. H04B 7/0413; H04W 84/12; H04W 28/048; H04L 2025/03426; H04L 1/24; H04L 27/2602; H04L 1/20; H04L 7/042
USPC ................................................. 370/228–352
See application file for complete search history.

(56) References Cited

U.S. PATENT DOCUMENTS

| | | | | |
|---|---|---|---|---|
| 7,027,533 B2 * | 4/2006 | Abe et al. | ...................... | 375/341 |
| 7,539,463 B2 * | 5/2009 | Himayat et al. | .............. | 455/101 |
| 7,636,401 B2 * | 12/2009 | Hammerschmidt | .......... | 375/267 |
| 7,684,479 B2 * | 3/2010 | Hammerschmidt | .......... | 375/229 |
| 7,760,758 B2 * | 7/2010 | Okello | .......... | 370/465 |
| 7,885,324 B2 * | 2/2011 | Hammerschmidt | .......... | 375/229 |
| 7,966,545 B2 * | 6/2011 | Cho et al. | ...................... | 714/755 |
| 7,978,778 B2 * | 7/2011 | Wallace et al. | ............... | 375/267 |
| 7,978,779 B2 * | 7/2011 | Wu et al. | ....................... | 375/267 |
| 8,060,033 B2 * | 11/2011 | Himayat et al. | ................ | 455/101 |
| 8,134,976 B2 * | 3/2012 | Wallace et al. | ............... | 370/332 |
| 8,145,243 B2 * | 3/2012 | Mohanty et al. | .............. | 455/458 |
| 8,155,063 B2 * | 4/2012 | Choi | ............................. | 370/329 |
| 8,160,121 B2 * | 4/2012 | Forenza et al. | ............... | 375/141 |
| 8,169,889 B2 * | 5/2012 | Walton et al. | ................. | 370/208 |
| 8,175,181 B1 * | 5/2012 | Nabar et al. | ................... | 375/267 |
| 8,249,177 B2 * | 8/2012 | Adar et al. | .................... | 375/259 |
| 8,285,226 B2 * | 10/2012 | Lundby et al. | ................ | 455/101 |
| 8,331,510 B2 * | 12/2012 | Khayrallah et al. | .......... | 375/348 |

(Continued)

*Primary Examiner* — Ayaz Sheikh
*Assistant Examiner* — Venkatesh Haliyur
(74) *Attorney, Agent, or Firm* — File-EE-Patents.com; Jay A. Chesavage

(57) ABSTRACT

A configurable network adapter has N analog front ends, each generating a receiver output and a transmitter input. In a first mode of operation, the analog front end receiver outputs are coupled to a MIMO equalizer, which is coupled to an outer receiver and to a first MAC input, with the first MAC having an output coupled to an outer transmitter, a MIMO modulator, and to the analog front end transmitter inputs. In a second mode of operation, one or more of the analog front ends is directed to a SISO modulator fed by a second outer transmitter coupled to a second MAC transmitter output. An associated one or more of the analog front end receivers is coupled to a SISO equalizer, and thereafter to an outer receiver and to the second lower MAC, thereby providing a first mode for a single MIMO adapter and a second mode for a MIMO plus independent PAN interface.

18 Claims, 19 Drawing Sheets

(56) References Cited

U.S. PATENT DOCUMENTS

| | | | |
|---|---|---|---|
| 8,365,051 B2 * | 1/2013 | Chun et al. | 714/780 |
| 8,400,974 B2 * | 3/2013 | Mueck et al. | 370/329 |
| 8,411,779 B2 * | 4/2013 | Okello | 375/267 |
| 8,477,874 B2 * | 7/2013 | Segal et al. | 375/316 |
| 8,570,988 B2 * | 10/2013 | Wallace et al. | 370/338 |
| 8,599,709 B2 * | 12/2013 | Chen et al. | 370/252 |
| 8,599,780 B2 * | 12/2013 | Heidari et al. | 370/329 |
| 2002/0161560 A1 * | 10/2002 | Abe et al. | 702/196 |
| 2002/0193146 A1 * | 12/2002 | Wallace et al. | 455/562 |
| 2006/0223460 A1 * | 10/2006 | Himayat et al. | 455/101 |
| 2007/0036245 A1 * | 2/2007 | Hammerschmidt | 375/340 |
| 2007/0036246 A1 * | 2/2007 | Hammerschmidt | 375/340 |
| 2007/0258353 A1 * | 11/2007 | Okello | 370/204 |
| 2008/0028277 A1 * | 1/2008 | Cho et al. | 714/758 |
| 2008/0107199 A1 * | 5/2008 | Lakkis | 375/260 |
| 2009/0028253 A1 * | 1/2009 | Wu et al. | 375/260 |
| 2009/0268675 A1 * | 10/2009 | Choi | 370/329 |
| 2010/0041351 A1 * | 2/2010 | Himayat et al. | 455/101 |
| 2010/0234071 A1 * | 9/2010 | Shabtay et al. | 455/562.1 |
| 2010/0246656 A1 * | 9/2010 | Hammerschmidt | 375/229 |
| 2010/0254446 A1 * | 10/2010 | Khayrallah et al. | 375/232 |
| 2010/0284495 A1 * | 11/2010 | Segal et al. | 375/316 |
| 2011/0026503 A1 * | 2/2011 | Mueck et al. | 370/338 |
| 2011/0076991 A1 * | 3/2011 | Mueck et al. | 455/414.1 |
| 2011/0103301 A1 * | 5/2011 | Mueck et al. | 370/328 |
| 2011/0276861 A1 * | 11/2011 | Chun et al. | 714/780 |
| 2012/0195243 A1 * | 8/2012 | Choi | 370/311 |
| 2012/0207032 A1 * | 8/2012 | Chen et al. | 370/252 |
| 2013/0201316 A1 * | 8/2013 | Binder et al. | 348/77 |

* cited by examiner

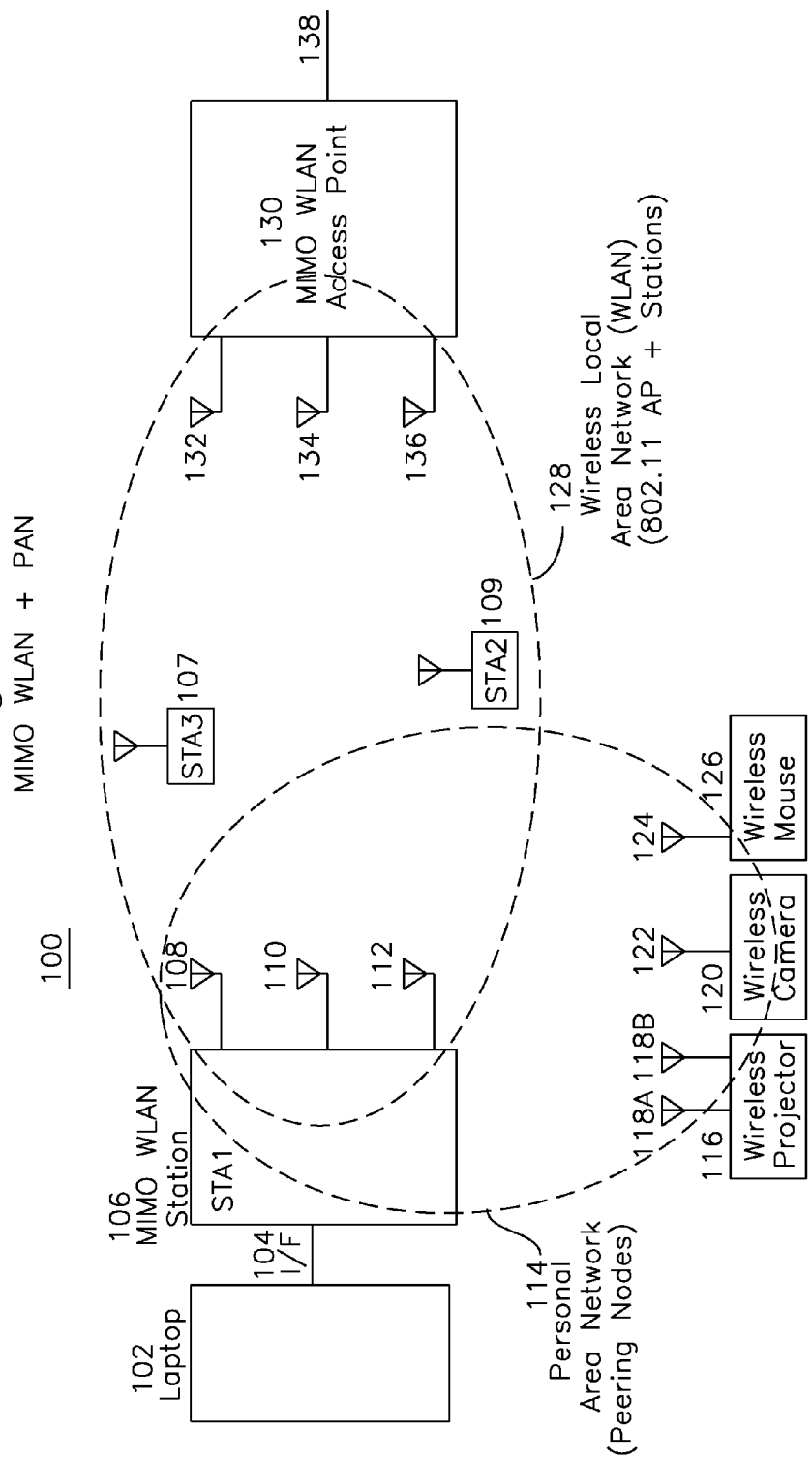

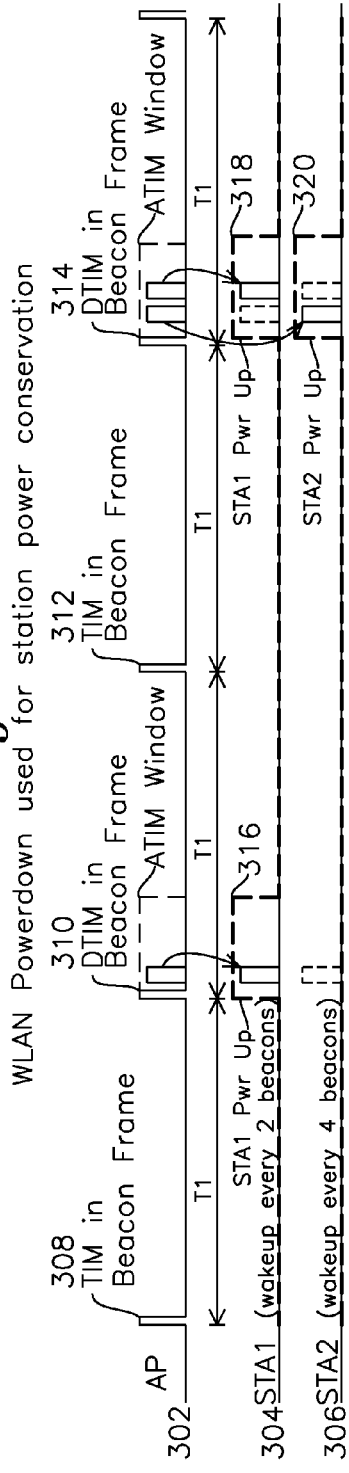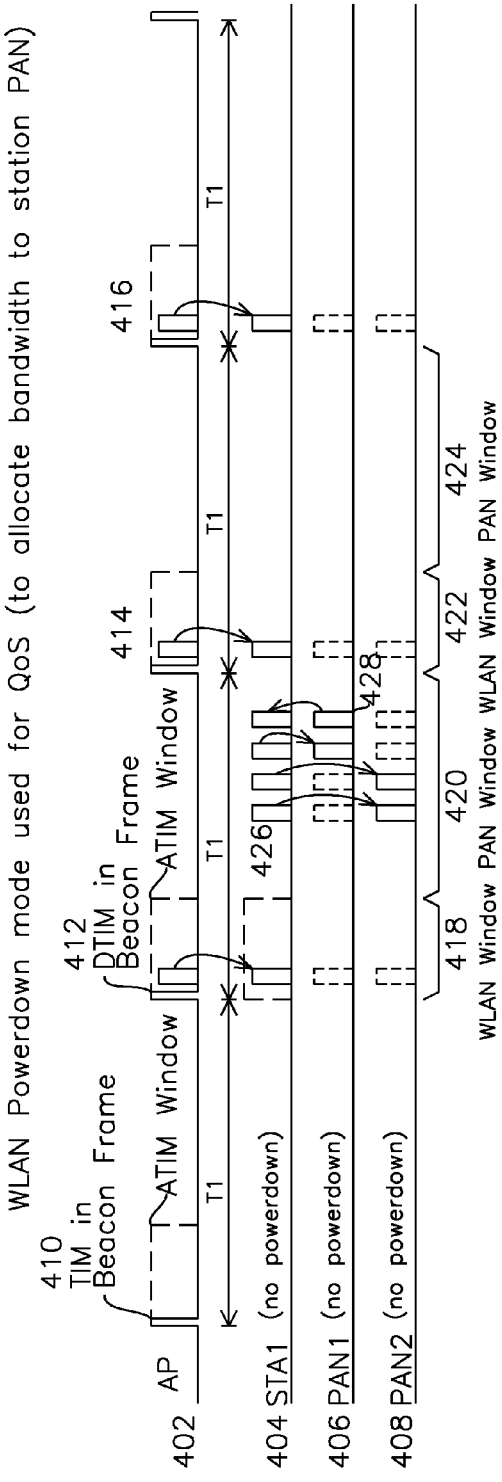
Figure 3
Figure 4

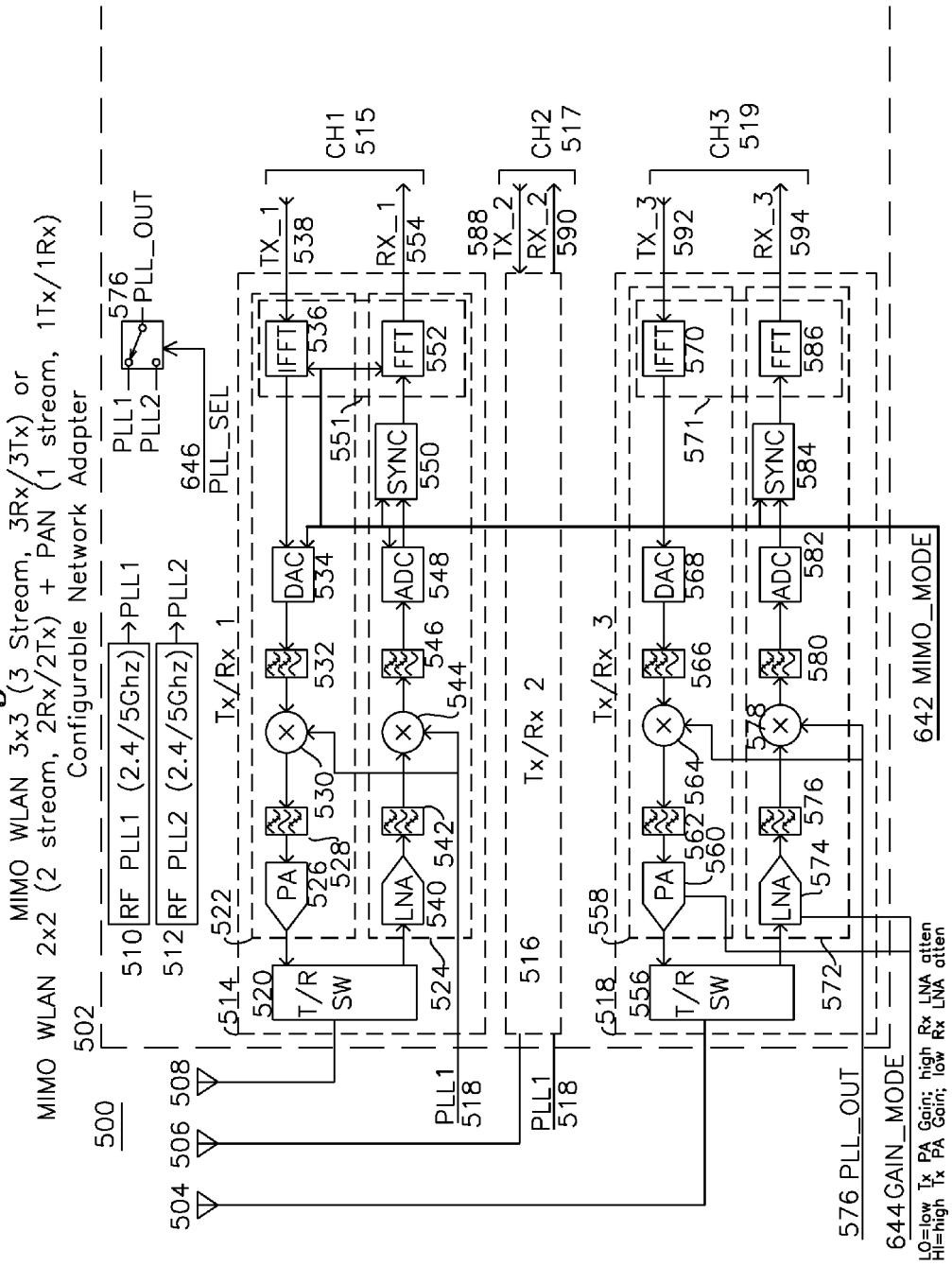

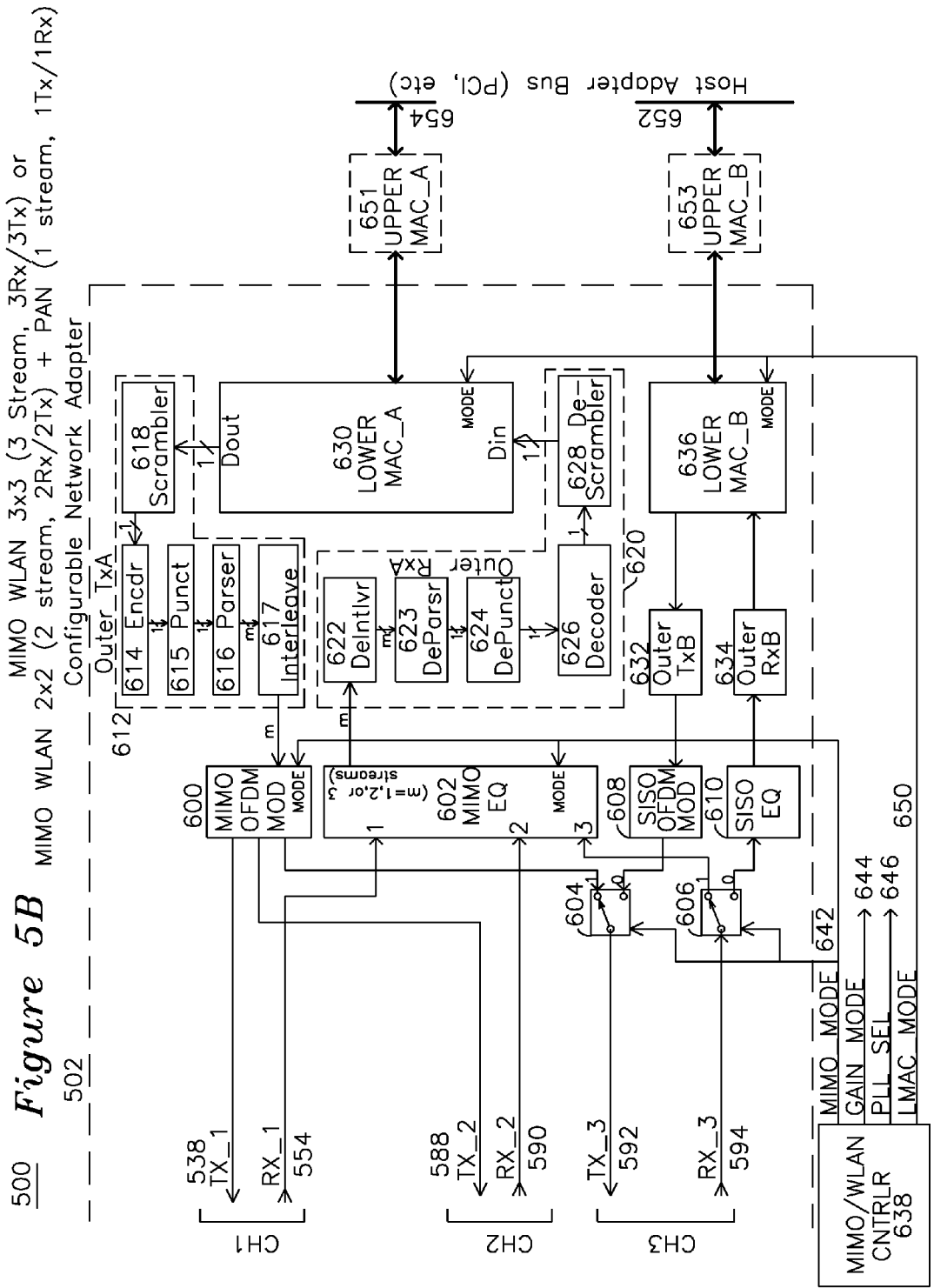
Figure 5B  MIMO WLAN 3x3 (3 Stream, 3Rx/3Tx) or
MIMO WLAN 2x2 (2 stream, 2Rx/2Tx) + PAN (1 stream, 1Tx/1Rx)
Configurable Network Adapter STA Configuration as 3x3 WLAN STA Configuration as 2x2 WLAN plus PAN STA Configuration as 2x2 PAN plus WLAN STA Configuration as 3x3 PAN)

Figure 5D
MIMO WLAN / MIMO WLAN+PAN
STA Configurations (for 3 antenna AP)

| Configuration | Ref | #WLAN Strm | #PAN Strm | MIMO MODE | MOD/EQ A | MOD/EQ B | LMAC A | LMAC B |
|---|---|---|---|---|---|---|---|---|
| 3x3 WLAN (no PAN) | Fig 5C-1 | 1 | 0 | 1x3 | 1x3 | OFF | WLAN | OFF |
|  |  | 2 | 0 | 2x3 | 2x3 | OFF | WLAN | OFF |
|  |  | 3 | 0 | 3x3 | 3x3 | OFF | WLAN | OFF |
| 2x2 WLAN + 1 PAN | Fig 5C-2 | 1 | 1 | 1x2 | 1x2 | ON | WLAN | PAN |
|  |  | 2 | 1 | 2x2 | 2x2 | ON | WLAN | PAN |
| 2x2 PAN + 1 WLAN | Fig 5C-3 | 1 | 1 | 1x2 | 1x2 | ON | PAN | WLAN |
|  |  | 1 | 2 | 2x2 | 2x2 | ON | PAN | WLAN |
| 3x3 PAN (no WLAN) | Fig 5C-4 | 0 | 1 | 1x3 | 1x3 | OFF | PAN | OFF |
|  |  | 0 | 2 | 2x3 | 2x3 | OFF | PAN | OFF |
|  |  | 0 | 3 | 3x3 | 3x3 | OFF | PAN | OFF |

Figure 5E
MIMO WLAN / MIMO WLAN+PAN
STA Configurations

| Configuration | | LNA&PA | LNA&PA |
|---|---|---|---|
| Ch 1&2(A) | Ch 3(B) | Ch 1&2(A) | Ch 3(B) |
| 2.4GHz WLAN | 2.4GHz PAN | HI | LO |
| 2.4GHz WLAN | 5GHz PAN | HI | HI |
| 2.4GHz PAN | 2.4GHz WLAN | LO | HI |
| 2.4GHz PAN | 5GHz WLAN | HI | HI |
| 5GHz WLAN | 2.4GHz PAN | HI | HI |
| 5GHz WLAN | 5GHz PAN | HI | HI |
| 5GHz PAN | 2.4GHz WLAN | HI | HI |
| 5GHz PAN | 5GHz WLAN | LO | HI |

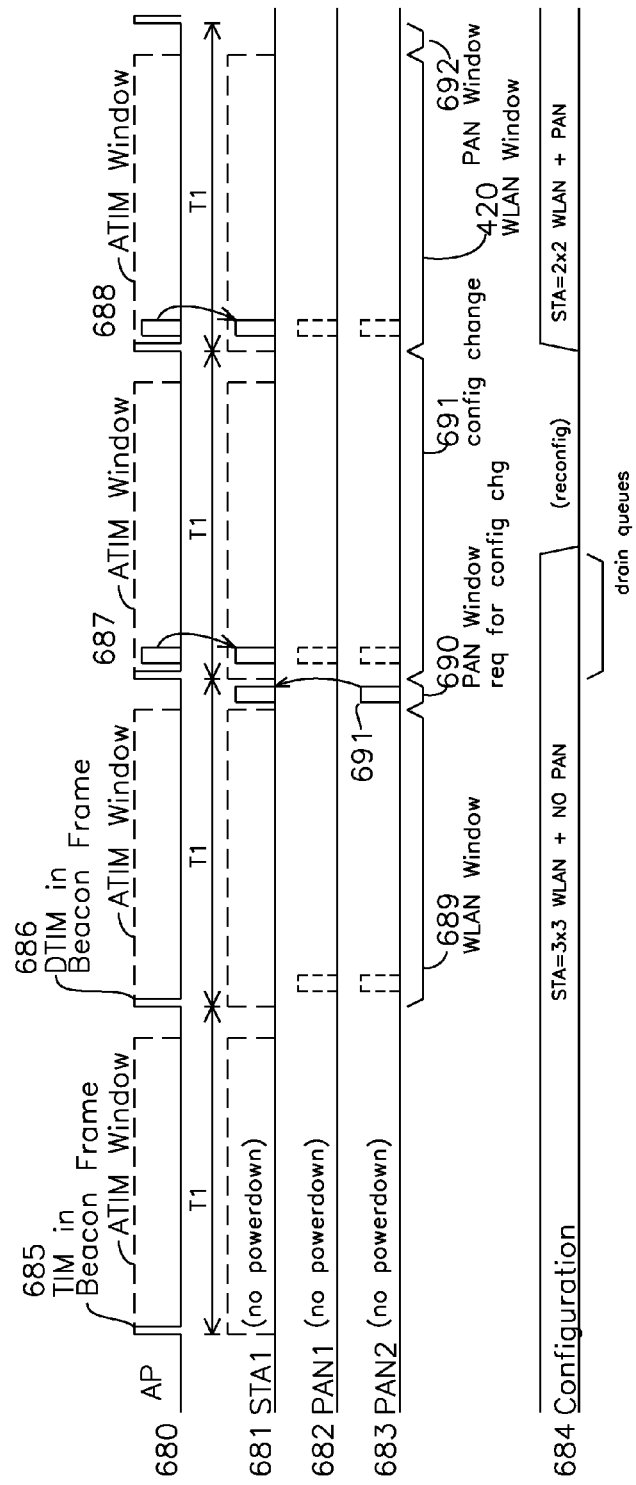

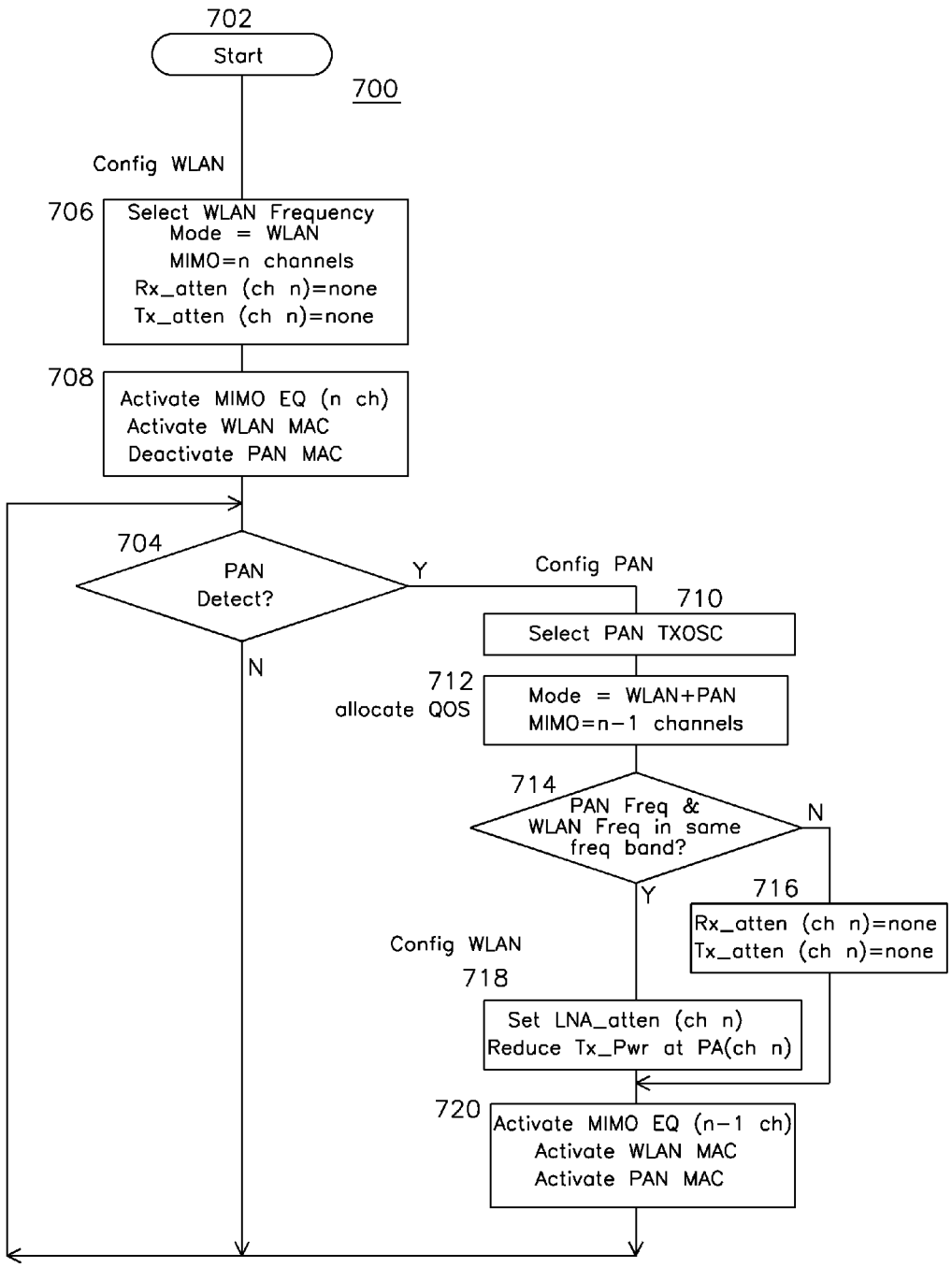

Reconfigurable MIMO WLAN AP/STA

4x4 MIMO: m=4 spatial streams, n=1 data stream

3x3 MIMO + SISO: m=3+1 spatial streams, n=2 data streams

2x2 MIMO + 2x2 MIMO: m=2 spatial streams/2 antennas, n=2 data streams

2x2 MIMO + 2 SISO: m=1 spatial streams/2 antennas+2 SISO, n=3 data streams

Figure 8D
MIMO Configurations

| Configuration | Ref | Total #MIMO Strm | Total #SISO Strm | MIMO MODE | LMAC |
|---|---|---|---|---|---|
| 4x4 MIMO | Fig 8C-1 | 1 | 0 | 1x4 | 1x4_MIMO |
|  |  | 2 | 0 | 2x4 | 2x4_MIMO |
|  |  | 3 | 0 | 3x4 | 3x4_MIMO |
|  |  | 4 | 0 | 4x4 | 4x4_MIMO |
| 3x3 MIMO + SISO | Fig 8C-2 | 1 | 1 | 1x3 | 1x3_MIMO+SISO |
|  |  | 2 | 1 | 2x3 | 2x3_MIMO+SISO |
|  |  | 3 | 1 | 3x3 | 3x3_MIMO+SISO |
| 2x2 MIMO + 2x2 MIMO | Fig 8C-3 | 2/0 | 0 | 2x2/– | 2x2_MIMO_SINGLE |
|  |  | 2/2 | 0 | 2x2/2x2 | 2x2_MIMO+2x2_MIMO |
| 2x2 MIMO + 2 SISO | Fig 8C-4 | 2 | 0 | 2x2 | 2x2_MIMO_ONLY |
|  |  | 2 | 1 | 2x2 | 2x2_MIMO_1SISO |
|  |  | 2 | 2 | 2x2 | 2x2_MIMO_2SISO |
| 4 SISO | Fig 8C-5 | 0 | 1 | – | 1_SISO |
|  |  | 0 | 2 | – | 2_SISO |
|  |  | 0 | 3 | – | 3_SISO |
|  |  | 0 | 4 | – | 4_SISO |

Figure 8E
RF Front End Configurations
(j ≠ k ≠ m ≠ n)

| MIMO Config | Mod/Demod Config | Tx/Rx Config | | | |
|---|---|---|---|---|---|
|  |  | TxRx_1 | TxRx_2 | TxRx_3 | TxRx_4 |
| 4x4 MIMO | TxRx_[1-4]:4x4 MIMO | 2.4GHz | 2.4GHz | 2.4GHz | 2.4GHz |
|  |  | 5GHz(m) | 5GHz(m) | 5GHz(m) | 5GHz(m) |
| 3x3 MIMO +SISO | TxRx_[1-3]:3x3 MIMO | 2.4GHz | 2.4GHz | 2.4GHz | 5GHz(m) |
|  | TxRx_4: SISO | 5GHz(m) | 5GHz(m) | 5GHz(m) | 2.4GHz |
| 2x2 MIMO +2x2 MIMO | TxRx_[1-2]:2x2 MIMO | 5GHz(m) | 5GHz(m) | 5GHz(n) | 5GHz(n) |
|  | TxRx_[3-4]:2x2 MIMO | 2.4GHz | 2.4GHz | 5GHz(m) | 5GHz(m) |
|  |  | 5GHz(m) | 5GHz(m) | 2.4GHz | 2.4GHz |
| 2x2 MIMO +2 SISO | TxRx_[1-2]:2x2 MIMO | 2.4GHz | 2.4GHz | 5GHz(j) | 5GHz(k) |
|  | TxRx_3: SISO | 5GHz(m) | 5GHz(m) | 5GHz(j) | 5GHz(k) |
|  | TxRx_4: SISO | 5GHz(m) | 5GHz(m) | 5GHz(j) | 2.4GHz |
| 4 SISO | TxRx_[1-2]: SISO(2x) | 2.4GHz | 5Ghz(j) | 5GHz(k) | 5GHz(m) |
|  | TxRx_3: SISO | 5GHz(j) | 5GHz(k) | 5GHz(m) | 5GHz(n) |
|  | TxRx_4: SISO |  |  |  |  |

Reconfigurable Processor Channel Use
Example Channels (40Mhz 802.11n channels)

Clear Channel Assessment & multi-stream transmit

RECONFIGURABLE MULTI-STREAM PROCESSOR FOR MULTIPLE-INPUT MULTIPLE-OUTPUT (MIMO) WIRELESS NETWORKS

FIELD OF THE INVENTION

The present invention relates to a host adapter or access point for a wireless communications system. In particular, the invention relates to a host adapter or access point which is configurable in a first mode to utilize N transmit/receive front ends coupled to N antennas to modulate/demodulate M streams of data (where M<=N) from the N transmit/receive front ends in an M×N MIMO (Multiple Input Multiple Output) mode, as well as operate in a second mode where at least one transmit/receive front end is coupled to a SISO (Single Input Single Output) channel and the remaining N−1 transmit/receive front ends are coupled to an (M−1)×(N−1) MIMO signal processor, with the SISO signal processing channel optimized for mixed simultaneous use with the MIMO channels.

BACKGROUND OF THE INVENTION

Wireless local area networks are commonly used to provide network connectivity, and one popular protocol for high speed wireless communications is 802.11n MIMO as described in the 802.11 family of Institute of Electrical and Electronics Engineers (IEEE) family of wireless local area network (WLAN) standards. Network adapters which use the MIMO protocol have N multiple antennas, each coupled to an analog front end having a transmit input and a receive output, with the analog front end receive outputs coupled to an N channel MIMO baseband processor, where the MIMO baseband processor generates M spatial streams which are combined in some manner at a MIMO equalizer and data streams are separated and coupled to the input of a media access controller (MAC) which includes a host adapter interface such as PCI coupled to a laptop computer or gateway. In the transmit direction, the MAC has a transmit output which is coupled to a baseband processor which generates N channels of modulated data, each of which is coupled to an analog front end transmit input. In a typical M×N MIMO station (STA), the subject station has N antennas and associated analog front ends, each operative on one of the N spatial streams, and the station extracts M data streams that were transmitted by the M remote antennas at the access point (AP). In the present invention, a spatial stream is associated with each antenna that forms the MIMO channel and optionally individual data streams are carried within each MIMO channel, such that N spatial streams of an N×N MIMO stream can carry M data streams. A special case is a SISO stream, where one spatial stream carries one data stream. In a typical MIMO configuration, the plurality M data streams are combined to form a single high speed data interface at M times the native rate R of each single stream. For example, in a 3 spatial stream MIMO network, with each remote transmitter, channel, and local receiver supporting a 150 Mbps (million bits per second) data stream, the host adapter can be configured to generate a single data stream of 450 Mbpd over the WAN.

In one type of wireless network commonly known as a MIMO wireless local area network (WLAN), a plurality of stations (STA) having MIMO capability are directly accessible to a MIMO access point (AP) which has wired or wireless connectivity to another network, where the AP acts as a gateway to that network. Alternatively, the stations may form a peer-to-peer network where the network traffic is directed from one device to another without passing through the gateway. This type of network with physically adjacent stations is known as a Personal Area Network (PAN). In the context of the present disclosure, a WLAN station is one which operates according to at least one of the 802.11 standards as a BSS (Infrastructure) station, and the PAN station operates according to at least one of the 802.11 standards as a peer station in a peering mode. In a PAN, one device is configured as a group owner and sends timing beacon packets, and the other peering stations synchronize to the group owner beacon and transmit during intervals which follow the group owner beacon. One of the consequences of the close physical placement of peers next to each other in a PAN is a reduced RF transmit power level requirement. A PAN network typically has separation distances between peers on the order of a few meters, compared to a WLAN where the distance from a WLAN STA to WLAN AP is on the order of 30 meters in an indoor setting, and significantly longer in an outdoor setting.

It is desired to provide a network host adapter or access point which can reconfigure existing signal processing functions for a MIMO spatial stream into signal processing functions for one or more independent MIMO spatial wireless streams and optionally one or more SISO data streams.

It is desired to provide a network host adapter or access point which can reconfigure for multiple wireless spatial streams, the host adapter or access point having at least one analog front end processor having gain and power control such that reduced transmit power and receive sensitivity is selected when the analog front end processor is configured for a personal area network.

It is desired to provide a network host adapter or access point which provides a first mode which operates transparently as an 802.11n MIMO adapter carrying N spatial streams, with the network host adapter or access point also having a second mode whereby the existing signal processing bandwidth of the MIMO adapter may be divided between a first set of spatial streams less than N and forming MIMO data streams and a second set of spatial streams which remain, the second set of spatial streams carrying at least one spatial stream configured as SISO or MIMO, and containing at least one of either a SISO stream or a MIMO stream.

OBJECTS OF THE INVENTION

A first object of this invention is a host adapter for a MIMO communications system having:

a first (pure MIMO) mode of operation where a plurality N of WLAN antennas is coupled to a plurality N of WLAN receivers, the outputs of each of the N WLAN receivers performing baseband mixing and Fourier transform operations, the Fourier transformed signals thereafter coupled to MIMO receive equalizer for separating the MIMO receive spatial streams into a composite data stream, the composite data stream thereafter coupled into an outer receiver, and thereafter coupled to a baseband processor and a first MAC, the first MAC also accepting streams of MIMO transmit data which are coupled to an N channel MIMO modulator which generates a plurality N of MIMO transmit spatial streams which are each coupled to one of N transmitters, each of the WLAN transmitter coupled to one of the WLAN antennas;

a second (mixed MIMO) mode of operation where a plurality N−1 of the WLAN antennas are coupled to a plurality N−1 WLAN receivers, all of which N−1 WLAN receiver outputs are coupled to a MIMO receive baseband processor operative in an N−1 mode for combining the N−1 MIMO receive spatial streams into a receive data streams, the receive data stream thereafter coupled to a first media access controller (MAC) for generation of MAC data, the first MAC also receiving transmit packets and generating a stream of MIMO transmit data which is coupled to an N–1 channel MIMO baseband processor which modulates the MIMO transmit data stream and generates a plurality N–1 of MIMO transmit spatial streams, each of which is coupled to one of the N–1 transmitters, each said transmitter coupled to one of the WLAN antennas, the mixed MIMO mode of operation also coupling one of the WLAN antennas to a WLAN receiver, the output of the WLAN receiver coupled to a SISO receive equalizer for generating a receive data stream, the receive data stream coupled to a second baseband processor and thereafter to a second MAC for generation of one or more streams of receive PAN data, the second MAC also generating a transmit stream from the PAN data, the transmit single spatial stream coupled to a transmitter, and thereafter to an antenna.

A second object of the invention is a plurality of analog front end processors, each analog front end processor coupled to an antenna for transmission and reception of modulated RF at a carrier frequency, each analog front end processor also coupled to an independent carrier frequency source for baseband mixing and carrier modulation, each analog front end processor also coupled to a baseband processor including a transmit modulator, a receive equalizer, and a media access controller, the baseband processor reconfigurable into transmit processing and receive processing of at least a MIMO spatial stream and alternatively a MIMO spatial stream and simultaneously at least one SISO stream.

A third object of the invention is a reconfigurable WLAN network adapter which transmits one set of wireless spatial streams on a first transmit channel and a at least one different wireless spatial stream on a second transmit channel at a different channel frequency than the first transmit channel, transmission on the first wireless channel coordinated with transmission on the second wireless channel to maximize the likelihood of simultaneous transmission on both channels and minimize the likelihood of transmission on one channel causing receive corruption on a different channel.

SUMMARY OF THE INVENTION

A host adapter has a plurality N of receivers, a plurality N of transmitters, and a plurality N of antennas, each antenna coupled to one of the receivers and to one of the transmitters using a TR switch. In a first (WLAN-MIMO) mode of operation, the N receiver outputs are each associated with a spatial stream carrying associated data at a rate R and are coupled to a MIMO equalizer to generate a combined MIMO data stream which has a data rate substantially equal to N*R. In a second WLAN-MIMO plus PAN mode of operation, the MIMO equalizer is reconfigured such that N–1 spatial streams from receiver outputs coupled to the MIMO equalizer generate a single stream at rate (N–1)*R which is coupled to a first MAC, and the remaining Nth receiver is coupled to a separate SISO equalizer to generate a separate data stream at a rate R, and this separate stream is coupled to a second MAC separate from the first MAC, thereby providing an operating mode which provides a first MAC interface associated with the WLAN-MIMO, and a second independent MAC interface associated with the PAN. In a generalized second WLAN-MIMO mode plus PAN mode of operation, the (N–1) MIMO channels can carry either WLAN or PAN traffic independently from the single Nth channel and at a different channel frequency, which may also carry either WLAN or PAN traffic. In this manner, MIMO adapter having N spatial antennas and spatial receiver front end processor channels may be reconfigured without additional complexity to provide a pure MIMO mode having a single MAC interface in a MIMO system using all N channels combined together, or in a mixed MIMO mode having two independent MAC interfaces, where the first MAC interface can carry a SISO channel or 2 to M MIMO channels (where M<=N and N>=2), and the second MAC interface can carry 0 to (N–m) channels, with (N–m)=1 being SISO or (N–m)>2 being MIMO channels, and the first MAC or second MAC interface being either WLAN (associated with an access point AP) or PAN (a peer to peer network such as with a group owner). The invention may be generalized to any number of independently operating MIMO data streams and SISO data streams which can be supported by the N antennas of the wireless station/access point, with each independently operating SISO or MIMO spatial stream operating in a separate channel from any other SISO or MIMO spatial stream of the station/access point.

BRIEF DESCRIPTION OF THE DRAWINGS

FIG. 1 is a block diagram for a WLAN and PAN.

FIG. 3 is a timing diagram for a WLAN powerdown modes as used for power conservation.

FIG. 4 is a timing diagram for QOS bandwidth allocation using a powersave protocol.

FIGS. 5A and 5B are block diagrams for a configurable network adapter.

FIGS. 5C-1, 5C-2, 5C-3, and 5C-4 are example configurations for the configurable network adapter of FIGS. 5A and 5B.

FIG. 5D is a table of example configurations for the adapter of FIGS. 5A and 5B.

FIG. 5E is a table of transmitter and receiver attenuation configurations for the adapter of FIGS. 5A and 5B.

FIG. 6 is a timing diagram for automatic mode detection for the present invention.

FIG. 7 is a flowchart for a configuration method for the present invention.

FIGS. 8C-1, 8C-2, 8C-3, 8C-4, 8C-4 and 8C-5 show block diagrams for FIG. 8B operating in various configuration modes.

FIG. 8D shows a listing of possible MIMO configurations.

FIG. 8E shows a configuration table for various analog front end configurations.

DETAILED DESCRIPTION OF THE INVENTION

Figures 1, 5C:
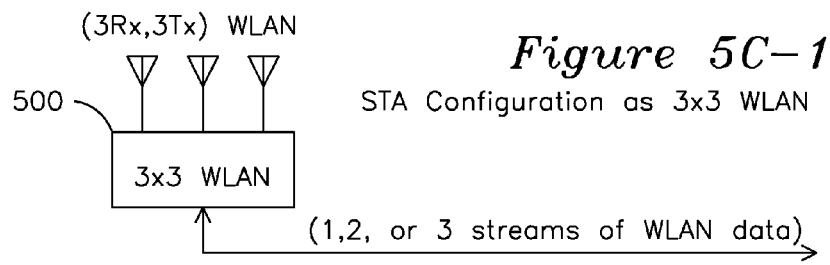
Figures 2, 5C:
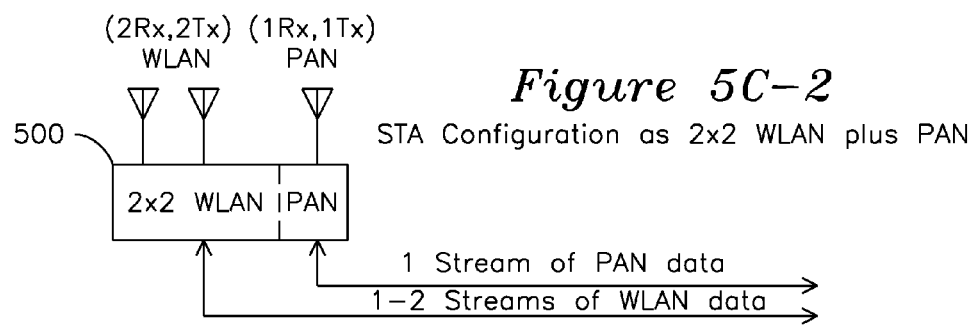

A problem arises when a user of a MIMO WLAN may also wish to have peering connectivity with local peripherals, such as the case of a laptop computer acting as a STA on a WLAN to an AP for access to Internet Protocol (IP) services, where the laptop also has a wireless mouse, a wireless camera sending images, or a wireless projector, and these stations all communicate exclusively with the local laptop host adapter using a PAN. These local devices functionally use the PAN in the same manner as peripherals connected to the laptop via USB, Firewire, SCSI, or any other local peripheral bus. One distinguishing feature of a device on the PAN is that the communication is directly between the station (STA) and the laptop host adapter (with the laptop as 'group owner'), and none of the data over the PAN has any need to be transmitted to the AP (access point) using the gateway to other networks that the AP provides to non-peering stations. FIG. 1 shows one such network configuration 100. A laptop 102 is coupled using a host adapter interface 104 such as PCI to a MIMO WLAN station 106 which is capable of the 802.11n protocol for MIMO. The host adapter station 106 is coupled through a wireless local area network WLAN 128 to MIMO access point 130, which includes a plurality of antennas 132, 134, 136 which receive the MIMO transmitted data (shown in FIG. 1 as 3×3 MIMO), which MIMO streams may be aggregated and coupled to another network (not shown), such as through a gateway 138 of the AP 130. Other stations 109 and 107 are also part of the WLAN 128. Laptop 102 also has wireless peripherals such as a wireless mouse 126 with associated antenna 124, wireless camera 120 with associated antenna 122, and high bandwidth wireless projector 116 capable of MIMO using antennas 118A and 118B, with the projector 116 coupled to the laptop 102 via WLAN station 106 using the personal area network 114, and this PAN 114 may operate separately from the WLAN such as by using a separate wireless adapter station (not shown), or by using a powerdown protocol that excludes WLAN traffic during certain intervals of a beacon interval, as will be described later. However accomplished, the object of the PAN 114 is to interconnect PAN stations 116, 120, 126 with laptop 102 such as by using a peer to peer wireless protocol and a separate PAN adapter (not shown) to 102, or by sharing the MIMO antennas 108, 110, and 112 and related data streams and using the powerdown protocol as shown in FIG. 1. Since the PAN 114 may use the same wireless protocol as WLAN 128, a problem arises whereby it is desired to prevent this PAN traffic from reaching the access point 130, as the PAN devices 116, 120, 126 are intended to be low power devices with modest transmit power and minimally sized antennas 118, 122, and 124, respectively, and these devices are located close to the host adapter 106 and laptop 102 for operator convenience, which may desirably reduce the power requirements. There are several mechanisms in use which provide PAN functionality using existing WLAN protocols, most of which rely on the power down (PD) functionality described in the 802.11 specification.

If a particular station has a large amount of data to send to the AP, then other stations will be unable to transmit their data until the first station completes. Similarly, another problem of sharing WLANs and PANs on the same network relates to providing a fixed channel bandwidth to each of the devices on the network, known as providing "quality of service" (QOS). For example, a problem may arise where station 106 has a large amount of data to send to AP 130 at a time when station 120 has a large amount of data to send to STA1 106. Alternatively, STA3 107 may have a large amount of data to send to AP 130 at a time when STA1 106 has a large amount of data to send to peer 116, and STA1 106 must wait until STA3 has completed, as must wireless mouse peer 126, during which time the mouse attached to the laptop 102 through the fully bandwidth-utilized PAN operates slowly or not at all. This network bandwidth contention problem becomes a significantly larger issue when the available network bandwidth of WLAN 128 is consumed by devices on that WLAN, thereby choking peering bandwidth available for PAN devices 116, 120, 126. It is desired to provide each of the devices with a known QOS so that during network congestion, the bandwidth allocated to the PAN is maintained at a level which provides both reliable WLAN connectivity and a fixed peering communications bandwidth.

Figure 2:
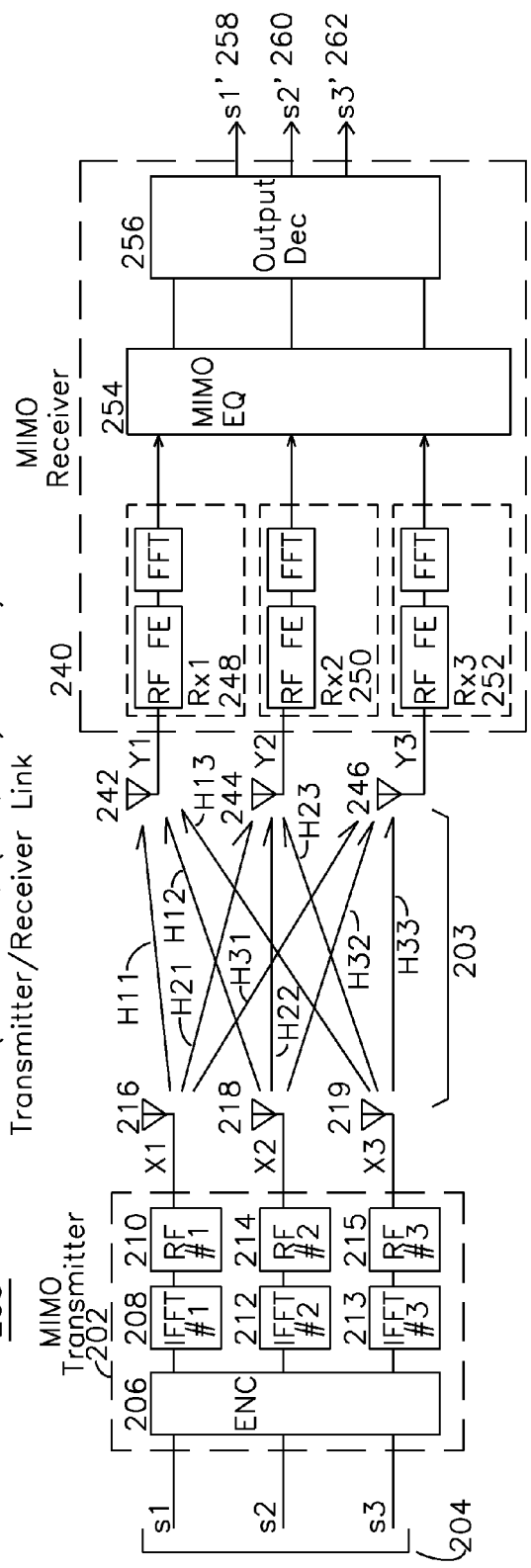
FIG. 2 is a simplified block diagram for a 3×3 MIMO transmitter and receiver.

FIG. 2 shows a simplified 3×3 MIMO transmitter 202 with a communications channel 203 to receiver 240. Transmitter 202 accepts three data streams s1, s2, s3 from interface 204, encodes them 206 into three encoded MIMO spatial streams, inverse Fourier transforms them 208, 212, 213, respectively, modulates them to one of the transmit channels within a carrier frequency range such as 2.4 Ghz or 5 Ghz, and amplifies the signals using analog front end 210, 214, and 215, respectively, to generate transmit spatial streams X1, X2, and X3, respectively, coupled to antennas 216, 218, and 219, respectively. Each transmit antenna (216, 218, 219) path to receive antenna (242, 244, 246) path includes particular reflections and attenuations through the channel 203 which has a unique spatial channel characteristic, expressed as the channel characteristic matrix H, such that each receive antenna 242, 244, 246 receives a linear combination of transmit antenna signals multiplied by a subcarrier-specific complex values that define the channel spatial characteristic H 203. The MIMO receiver 240 accepts these signals from the receive antennas 242, 244, 246, and applies them to separate receivers and signal processors 248, 250, 252, respectively, which receiver outputs are applied to a MIMO equalizer 254 and output decoder 256, which generates the three data streams s1' 258, s2' 260, and s3' 262 corresponding to streams s1, s2, and s3 of transmitter input 204. The particular example shown is a simplified 3×3 MIMO case for illustration purposes only. A typical station for bidirectional transmission and reception has a transmitter such as 202 and a receiver such as 240 which each share the multiple antennas using an interconnecting transmit/receive switch, as known in the art. Transmitter 200 and receiver 240 may operate under protocols established by the IEEE series of wireless standards, including IEEE 802.11, 802.11a, 802.11b, 802.11g, and for MIMO, 802.11n. Although a three transmitter stream, 3 antenna (3×3) MIMO configuration is shown in FIG. 2, many different MIMO configurations are possible.

Figures 3, 5C:
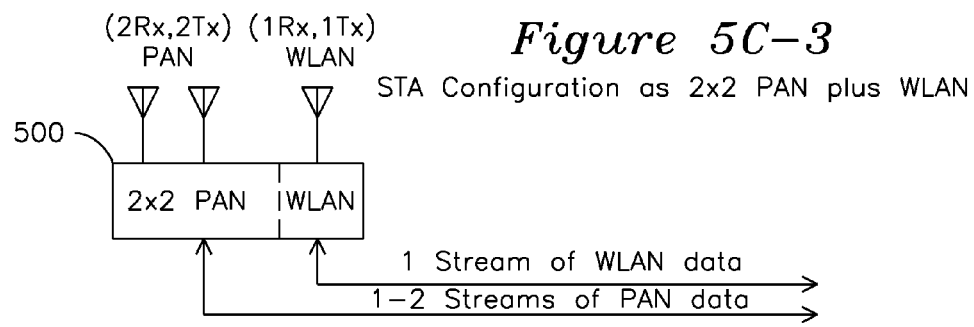

FIG. 3 shows the timing diagram for a WLAN powerdown protocol used in a typical network configuration for power saving purposes. An access point generates beacon frames 308, 310, 312, 314, which may contain a transmission information map, indicating which stations have data at the AP to download. The interval following the beacon is the time interval when data may be provided and is known as the ATIM window, shown as a dashed line. In the power savings protocol of FIG. 3, a first station such as 304 indicates that it can receive data every 2 beacon frames generated by the AP, such as during ATIM windows 316 and 318, and second station 306 indicates that it can receive data every 4 AP beacons 206 such as ATIM window 320, and the AP assumes the stations remain powered off at other times. Every second beacon, STA1 wakes up, receives frames within the ATIM window, and powers back down until two beacon frames from the AP have passed. Since the interval between beacon frames T1 is known to the STA, it may wake up at predetermined intervals to check for and handle AP traffic. The second AP is shown in 306, which may similarly operate with a wakeup every 4 AP beacons.

Figures 4, 5C:
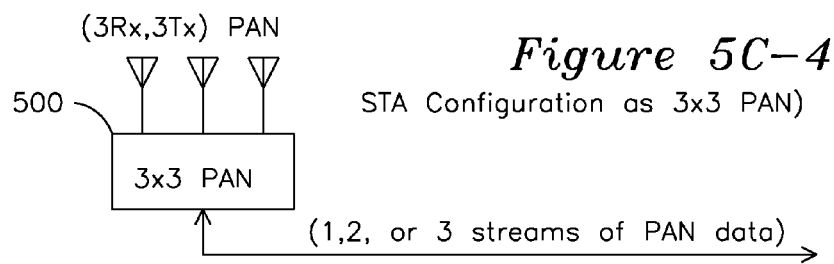

FIG. 4 shows an alternative use of WLAN powerdown to achieve QOS and shared use of the STA by the AP and the PAN, whereby the region inside the ATIM window is used for WLAN communications between the AP and STA, and regions outside the ATIM window, which the AP is instructed to ignore as station sleep periods, are used for peer to peer PAN communications. This "power down" mechanism without an actual station powerdown provides for flexible and programmable AP QoS by increasing or decreasing the region inside the ATIM window, which directly effects the percentage of time AP and STA may interchange data. Packets outside this ATIM window (used by the WLAN) are ignored by the AP (since it believes that the STA is in powerdown), and if the STA and PAN components use the interval outside the ATIM window, the STA and PAN may communicate directly with each other, such as by using a peer to peer protocol. The powerdown sequence method shown in FIG. 3 can provide fine grained QoS for the PAN based on the percentage of time the ATIM window is not open (outside WLAN communications). However, the nature of beacon transmissions by the AP is that they are relatively infrequent (a typical T1 is 100 ms), which means that a PAN request which arrives shortly after the ATIM window will result in a long latency for acquiring the data, since the PAN must wait until the end of the following beacon before transmitting new data.

FIGS. 5A and 5B show an example network adapter 500 of the present invention, for the case N=3 transmit/receive antennas 504, 506, 508 and associated analog front end signal processors 514, 516, 518, each of which carries one of the N spatial streams. A plurality of antennas 504, 506, and 508 of transmit/receive antennas are coupled to analog front end signal processors 514, 516, 518, respectively. An example analog front end and signal processor 514 has a TR switch 520 coupled to an antenna 508, and the TR switch 520 couples transmit signals from transmitter processing 522 to antenna 508 during transmit intervals, and couples received signals from antenna 508 to receiver 524 during receive intervals. Receiver processing 524 includes low noise amplifier 540, bandpass filter 542, mixer 544, image filter 546, analog to digital converter 548, synchronization and timing extraction 550, and FFT processor 552, which FFT output 554 and the other FFT processor outputs 590 and 554 are provided to MIMO equalizer 602. SISO equalizer 610 performs a similar function for single streams of FFT data by estimating OFDM symbols from the subcarriers provided. FFT (Fast Fourier Transform) 552 and IFFT (inverse FFT) 536 are used during mutually exclusive receive and transmit intervals, respectively, and as the hardware configuration between an FFT and IFFT is very similar, are shown as a single block 551 which contains a single FFT/IFFT block which is reconfigured and reused during transmit and receive intervals. ADC 548 and DAC 534 are similarly used during mutually exclusive intervals. SYNC function 550 performs some of the preamble detection and packet detection functions, and is only used during the preamble interval, and each of the various analog front end signal processors 514, 518, 518 provide a corresponding SYNC signal to preamble detect which is used in the packet detect circuit (not shown). In recognition that the DAC 534, ADC 548, SYNC 550, FFT 552 and IFFT 536 operate during different intervals, and one subset of analog front end signal processors is operating on one set of spatial streams associated with a MIMO link, with the other subset of analog front end signal processors operative on a SISO link which is asynchronous and unrelated to the MIMO link, a bussed (thick line) set of signals MIMO_MODE 642 is shown in FIG. 5A, with the control signals associated with a particular analog front end signal processor distributed accordingly, with the MIMO_MODE signals providing configuration and operating mode information to each analog front end signal processor to provide the functionality required for operation as a single 3×3 MIMO mode and 2×2 MIMO+SISO mode independent mode.

Baseband transmit data is generated by MIMO OFDM modulator 600 as N spatial streams for the pure MIMO case and, for the mixed MIMO case, baseband transmit data is provided to the N analog front end signal processors as N−1 spatial streams from the MIMO modulator 600 plus one baseband transmit data stream from the SISO OFDM modulator 608. In the pure MIMO case, the N baseband transmit outputs of the transmit modulator are coupled to all of the transmit inputs of the N analog front end signal processors as shown as 514, 516, 518. In the mixed MIMO case, the MIMO modulator 600 generates N−1 baseband transmit data outputs which are provided to the transmit inputs of the N−1 analog front end signal processors, and the SISO modulator 608 output is coupled through selector 604 to the Nth analog front end signal processor 518. The baseband transmit data from the SISO OFDM modulator 608 or MIMO OFDM modulator 602 is provided as a sequence of OFDM subcarrier mappings (as specified by the IEEE 802.11n standard) to IFFT 536 which generates the time-domain subcarriers that are coupled to DAC 534, low pass filtered 532, mixed to a subcarrier frequency by mixer 530, bandpass filtered 528 to remove the image modulation, amplified 526, and coupled to antenna 508 using TR switch 520. In one embodiment of the invention, analog front end signal processors 514 and 516 have identical processing functions, and analog front end signal processor 518 is also identical to 514 except for the added feature of accepting a gain mode input 644 to reduce the output power generated by power amplifier 560 or attenuation of the input signal level to LNA 574 of Nth receiver/transmitter 518. Also, in mixed MIMO/SISO mode, analog front end signal processor 518 receives MIMO_MODE 642 signals with timing associated with the SISO stream being received, whereas the group of MIMO_MODE 642 signals delivered to 514 and 516 having unrelated timing associated with the MIMO spatial streams being processed. The receive processing functions 572 of bandpass filter 576, mixer 578, low pass filter 580, analog to digital converter 582, synchronizing and timing 584, and FFT 586 are identical to the functions found in analog front end signal processor 514 and 518. Similarly, the transmit processing function 558 of IFFT 570, DAC 568, low pass filter 566, mixer 564, and band pass filter 562 perform substantially the same functions as the related functions of transmit processing 522.

In one configuration mode of the MIMO network adapter for standard N×N MIMO interoperability, a single RF carrier PLL1 510 is used by each analog front end signal processor 514, 516, 518 to generate the modulation carrier used by each transmit mixer such as 530 and each receive mixer such as 544. For this first (pure MIMO) configuration where the analog front end signal processor 514, 516, 518 operate together to generate a MIMO spatial stream, the first, second, and third analog front signal processors 514, 516, and 518, respectively, all use PLL1 and PLL_SEL 646 to select PLL_OUT as PLL1, which is fed to the Nth analog front end signal processor 518. During alternating transmit and receive cycles, the single RF_PLL1 510 furnishes the appropriate frequency by providing an alternating sequence of a transmit frequency for transmit mixer 530 during transmit intervals and receive frequency to receive mixer 544 during receive intervals, with the transmit frequencies generated at a specified channel transmit frequency and the receive frequency responsive to correction of offset, as is known in wireless transmit/receive links. The PLL1 is operative at the IEEE 802.11 RF channel frequencies of 2.4 Ghz (for 802.11b or 802.11g) or 5 Ghz (for 802.11a), as well as the combined channels of these frequency bands which form the 802.11n channels, which may span 40 Mhz bandwidth as shown in FIG. 8F, or alternatively 20 Mhz or 10 Mhz.

FIG. 5B shows some of the baseband processing functions. A first MAC 630 contains a hardware part known as a lower MAC which performs the functions of generating packets having a header prepended to a payload and a CRC (cyclic redundancy check) appended to the payload with the CRC computed over the header and payload, and any additional payload encryption such as a security engine may provide. The upper MAC functions which relate to the wireless network protocols such as QoS, powersave, association, and other host protocols are performed by a processor (not shown) which accesses the MAC through a host adapter bus 652. The lower MAC 630 generates a single output data stream which is coupled to the "outer transmit" functions 612 of the scrambler 618, encoder 614, puncturer 615, parser 616 which generates multiple parallel streams of data from the input stream. The outer transmit function 612 in one embodiment having a single combined data stream contains a single instance of: scrambler 618, encoder 614, and puncturer 614. Spatial parser 616 generates N separate outputs, one for each spatial stream, each spatial stream output delivered to a separate interleaver 617 providing a spatial stream to modulator 600. In the case where the MIMO stream contains M individual data streams, the M individual data streams are time multiplexed into a single stream and the spatial parser 883 generates individual spatial streams which are individually interleaved 617. However the outer Tx 612 is implemented, each stream is directed to an interleaver 616 and to OFDM modulator 600, which generates baseband subcarrier outputs from the parallel streams and couples them to the analog front ends 538 588, and 592. The receive spatial streams 554, 590, and 594 are coupled to a MIMO equalizer 602 for recovering received symbol triples from the MIMO spatial streams of received signals, and these output streams are provided to an outer receive function 620 which performs the operations described for outer transmit 612 in reverse. The plurality of streams is delivered to individual de-interleaver 622 for each stream, a deparser 623 which combines the N individual spatial streams into a single data stream, de-puncturer 624, decoder 626, and descrambler 628, which provide the descrambled stream (which may contain multiple data streams) to lower MAC 630 data input, and the first lower MAC 630 places the recovered packets with related payloads into a packet buffer (not shown) couples to the host interface 652. In the first (pure MIMO) mode, second lower MAC 636 is not used, but for reference has a transmit interface which is coupled to an outer transmit function 632 which performs the same functions described for outer transmit 612. In one alternate embodiment of the invention, the functions of the first 612 and second 632 outer transmit functions are multiplexed to achieve reuse. For example, deinterleaver 622 is operative on two data streams and the deinterleaver of outer RX function 634 is operative on a single stream. It is possible to use a single interleaver function and multiplex it across all three streams with context storage for each stream, as is known in the art of wireless functional block reuse. Other reuse of processing functions are available between first outer RX 620 and second outer Rx 634, as well as between first outer Tx 612 and second outer Tx 632. A stream of received signals from SISO channel N 594 is coupled to the SISO Equalizer 610 and is coupled to second outer receive functions 634, which provides a data stream of decoded data to the second lower MAC 636 for recovering the payloads from the packets and the lower MAC 636 can be coupled to adapter bus 652, or alternatively as shown, to an upper MAC function 651 which is coupled to a dedicated device which includes a packet buffer (not shown) for handling SISO or PAN packets.

The network adapter 500 of FIGS. 5A and 5B has several modes of operation. In a first MIMO operational mode of the invention, the analog front signal processors 514, 516, and 518 are identically configured and generate spatial streams 554, 590, 594, (shown for N=3) at data rate R which spatial streams are all coupled to MIMO equalizer 602, which may generate M=1, 2, or 3 data streams at an aggregate rate N*R to the outer receiver 620 coupled to lower MAC 630. Similarly, data at rate M*R can be retrieved from the packet buffer (not shown) by Lower MAC 630, optionally using an upper MAC 651 implemented in hardware or software, then delivered to outer transmit functions 612 having scrambler 618, encoder 614, puncturer 616, parser 616 which generates up to M (equal to N) streams of data which are applied in parallel to interleaver 617 with the streams thereafter applied to OFDM modulator 600 to generate N spatial streams of transmit symbol data 538, 588, and 592 for the case N=3, and the individual transmit spatial streams are coupled to analog front end signal processors 514, 516, and 518, mixed using the same carrier frequency, amplified, and thereafter coupled to antennas 504, 506, and 508, respectively. The modulation frequency source for this first (pure MIMO) mode of operation uses PLL1 for all three analog front signal processors 514, 516, and 518, and in pure MIMO mode, PLL_SEL is selected as PLL1 by switch 576. In the first (pure MIMO) mode of operation, the adapter operates as a single MIMO network adapter, and the only additional overhead is the modest complexity of the unused SISO modulator 608, SISO equalizer 610, outer Tx 632, outer Rx 634, second lower MAC 636, and second PLL 512. A configuration controller 638 generates a set of configuration signals including a MIMO_MODE signal 642 which indicates the particular MIMO mode (i.e. M×N where M is the number of streams, and N is the number of Tx/Rx processors), GAIN_MODE 644 (applied to third transmit processor 558 PA 560 and third receive processor 572 LNA 574), PLL_SEL 646 for selecting the local oscillator source provided to mixers 564 and 578 of the third analog front end signal processor 518, and LMAC_MODE 650 which indicates the mode of the first and second lower MACs. GAIN_MODE 644 is optionally used in a channel dedicated to Personal Area Network use to reduce the transmit power and receiver gain of the associated PAN analog front end signal processor where the associated PAN devices being communicated with are nearby and greater transmit power would likely interfere with other devices and increased receive sensitivity is unnecessary.

In the first (pure MIMO) mode of operation, the configuration controller 638 may select a 3×3 MIMO mode for the MIMO equalizer 602 and modulator 600, and multiplexers 604 and 606 direct the transmit signal 592 and receive signal 594, respectively, from modulator 600 and to equalizer 602, respectively. PLL select 646 selects PLL1 so that all three analog front ends 514, 516, and 518 are operative from the same PLL1 510 for transmit and receive operations, as is expected for MIMO communications of a receiver and transmitter of a station (STA) to an access point (AP). LMAC_MODE 650 enables the first lower MAC 630 and disables the second lower MAC 636. In the first (pure MIMO) mode, the network adapter thereby operates as a 3×3 MIMO adapter with a single MAC 630.

In a second (mixed MIMO) mode of operation which supports both WLAN and PAN operation (or two independent WLAN channels, or two independent PAN channels, for which one of the channels is SISO and the other is N−1 MIMO), the third analog front end 518 and associated signal processing are operative such as on a single 802.11g PAN or WLAN network, and the other front ends 514, 516 and associated signal processing are operative on a MIMO WLAN or a MIMO PAN. For this second (mixed MIMO) mode, the network adapter 500 is reconfigured by the MIMO/WLAN controller 638 such that the second MAC 636 handles SISO mode and the first MAC 630 handles MIMO mode with one N−1 streams (one less stream than pure MIMO mode). For this second (mixed MIMO) mode, the controller 638 generates MIMO_MODE 642 such that a single channel (SISO) implemented with second MAC 636 directs transmit frames through the outer transmitter 632 to SISO modulator 608, which is coupled TX_3 to the third analog front end transmitter 558 transmit stream TX_3 592 through multiplexer 604, and third front end processor 518 receive signals RX_3 594 are directed through multiplexer 606 to SISO equalizer 610, and thereafter to second outer receiver 634 and to second MAC 636. The multiplexers 604 and 606 are responsive to MIMO_MODE 642 control signals from controller 638, as before. In this manner, the second MAC 636 is able to re-use a large fraction of the existing circuitry of the MIMO receiver to provide the new function of an additional SISO interface. The first MAC 630 is coupled to outer transmitter 612 and outer receiver 620, which directs the two transmit spatial streams to MIMO modulator 600 and accepts two spatial streams forming MIMO data from first and second analog Front Ends to MIMO equalizer 602. The MIMO modulator 600 and MIMO equalizer 602 may operate in a 2×2 MIMO configuration according to MIMO_MODE 642 of the controller 638, which also generates an LMAC_MODE output 650 to enable the second lower MAC 636 as well as indicate the current shared resource (MIMO WLAN+PAN) mode to the first lower MAC 630. The controller 638 GAIN_MODE 644 and PLL_SEL 646, can be used for reducing interference between the first analog front end 514 and second analog front end 516, which are operating in one frequency channel, and the third front end 556, which is operating in a separate frequency channel. The controls provide for attenuating the transmit output power by reducing the PA 560 gain and also reducing the receiver gain level 574 when operating as a PAN with nearby devices for which signal to noise ratio is naturally favorable. The PLL_SEL 646 also provides for the independent selection of frequency for PLL2 512 through the multiplexer 576 and PLL_SEL which couples PLL2 to PLL_OUT and to the third analog front end 518 when mixed MIMO mode operation is in effect, such as when a WLAN is operating on one frequency, and a PAN is operating on a different frequency. When two transmitters for unrelated stations are operating (such as a PAN and WLAN both operating within the 2.4 Ghz band), the prior art method for handling the problem was to place the unrelated stations on different channels, where the commonly used channels are 1, 6, and 11. In a WLAN operating adjacent to a PAN, with each using different channels such as 1 and 6, a new problem arises where the upper subcarriers of the channel 1 station may interfere (overlap) with the lower subcarriers of the channel 6 station because the subcarrier modulation mask includes finite bandwidth. This overlap becomes a problem specific to mixed MIMO mode since antenna 506 when transmitting upper subcarriers of channel 1 may be in close proximity to antenna 504 which can be attempting to receive lower subcarriers of channel 6 at the same moment. To reduce this effect, and because the PAN has comparatively high SNR, gain mode 644 may be used to reduce the power level and receive signal level to the PAN, thereby improving the SNR of the WLAN by reducing the effect of this overlap interference from the out-of-band transmitter.

FIGS. 5C-1 through 5C-4 show various available configurations of the configurable network adapter 500 of FIGS. 5A and 5B. FIG. 5C-1 shows the station 500 configured as a 3×3 MIMO WLAN. FIG. 5C-2 shows the station 500 configured as a 2×2 MIMO WLAN with 1 SISO PAN, and FIG. 5C-3 shows station 500 configured as a 2×2 MIMO PAN with 1 SISO WLAN. FIG. 5C-4 shows the station configured as a 3×3 PAN with no WLAN. Other configurations are possible, but these are shown for the case of N=3 (three transmit/receive processors) and M (number of MIMO streams) set equal to N.

FIG. 5D shows a table of possible configurations which can be used with N=3 and the various configurations of FIG. 5C. Each configuration (3×3 WLAN+no PAN, etc) is accompanied by the relevant MIMO_MODE, MIMO modulator and MIMO equalizer configuration, as well as the MAC configurations. FIG. 5E similarly shows the RF LNA and PA gains for a variety of frequency configurations.

The basic configuration of the MIMO WLAN+PAN network adapter may be done manually or automatically. Manual configuration is straightforward and involves configuring the hardware to one of those shown in FIG. 5C according to user selections and the tables shown in FIGS. 5D and 5E. Automatic configuration is more complex, but provides great flexibility for adding new PAN devices automatically when a user enables one within the PAN network detection region 114. For autodetection of a new PAN device, a protocol is desired which provides a low bandwidth out-of-band channel for the detection of the device, followed by the reconfiguration of the adapter and resumption of operation in the reconfigured state. FIG. 6 shows an automatic mode detection timing diagram for one method, where the AP 680 of the WLAN network is sending beacons 685, 686, 687, and 688. The configuration 684 starts out as a 3×3 WLAN only (each channel having a rate of 150 Mhz), and PAN2 683 transmits a configuration request 691 during PAN request window 690, with the preceding balance of the beacon interval 689 providing 3×150 Mbps WLAN bandwidth of 450 Mbps. After this request, a reconfiguration occurs, during which time the WLAN may complete processing of any pending packets, and at the time of transmission of beacon 688, the configuration of the adapter is changed to 2×2 WLAN+PAN during window 688, thereby providing 300 Mhz of WLAN bandwidth and 150 Mhz of PAN bandwidth. When the PAN and WLAN operate simultaneously, the PAN window time is unnecessary, and is only provided during intervals when only the WLAN is operating and the PAN devices would otherwise not have an opportunity to signal a request.

FIG. 7 shows a flowchart for configuration of the adapter of FIGS. 5A and 5B. A WLAN configuration selects the WLAN frequency, with MIMO_MODE set to WLAN and N×N channels with no Rx LNA attenuation or Tx PA power reduction in step 706. The MIMO equalizer is activated for N channels and the WLAN MAC is activated in step 708, thereby establishing a standard M×N MIMO adapter with M data streams across N spatial streams of Tx/Rx channels. If a PAN configuration request is detected in step 704, then the PAN PLL2 is selected in step 710, followed by MIMO_MODE to N−1 data channels in the MIMO equalizer and MIMO modulator. If the PAN frequency and WLAN frequency are in the same frequency band (both at 2.4 Ghz or both at 5 Ghz), then the Rx LNA attenuator and Tx PA power reduction are set in step 718, otherwise no such attenuation is necessary as in step 716. The MIMO equalizer and modulator are activated with N−1 spatial streams in step 720, and the PAN MAC is activated to receive SISO streams from the SISO equalizer and provide them to the SISO modulator.

Figure 8A:
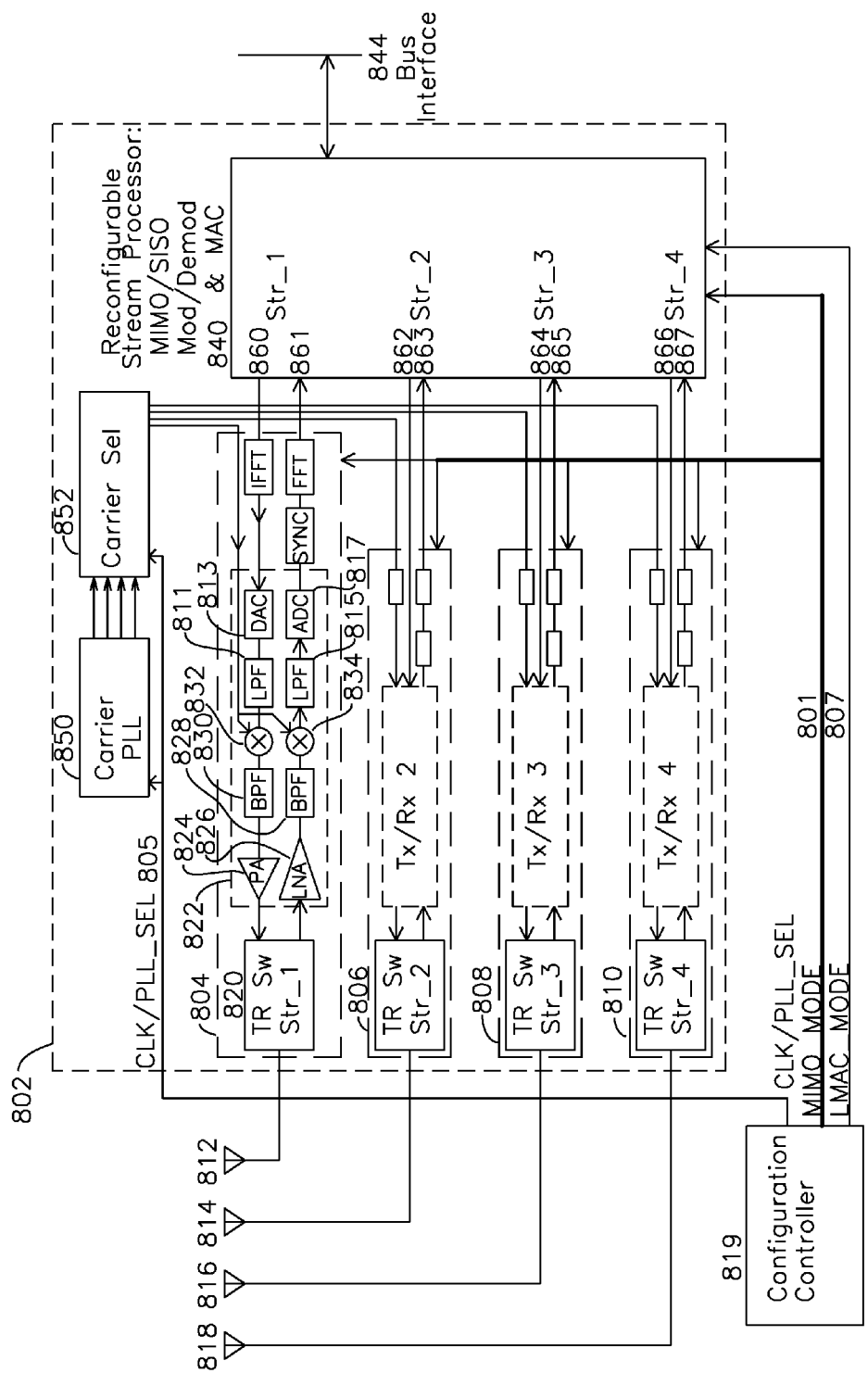
FIG. 8A is a block diagram for a reconfigurable MIMO WLAN multi-stream processor.

FIG. 8A shows a mixed WLAN configuration for a reconfigurable MIMO WLAN multi-stream processor 802, shown for the case of processing N=4 wireless spatial streams received on antennas 812, 814, 816, 818, where the antennas are typically physically separated by a distance sufficient to achieve channel diversity, as is known in the art of wireless MIMO communications. Any number of spatial streams may be present, with a change in the number of spatial processing streams of FIG. 8A modified accordingly. For example, FIG. 8A may be easily modified to show N=3 spatial streams. Each spatial stream Str__1, Str__2, Str__3, and Str__4 has an associated analog front end processor 804, 806, 808, and 810, respectively, which is coupled to antenna 812, 814, 816, 818, respectively, for receiving and transmitting wireless signals. An example analog front end processor 804 for one of the spatial streams comprises TR switch 820 which couples incoming RF signals to the low noise amplifier 826, which is coupled to bandpass filter 828 for reducing the noise bandwidth of the amplified signal, and the band pass filter 828 output is coupled to quadrature mixer 834 which generates a quadrature baseband output which is anti-alias low-pass filtered 815 and converted to a quadrature digital signal using analog to digital converter 817 and processed for each stream by reconfigurable MIMO/SISO modulator/demodulator/MAC 840. Carrier select 852 provides receive mixer 834 with a receive carrier frequency for the channel of operation from one of the modulation carrier PLL sources 850. Configuration controller 819 performs as described for FIGS. 5A and 5B, with MIMO_MODE 801 coordinating the switching of DAC 813, ADC 817, grouping of SYNC functions with associated MIMO and SISO channels, and controlling the FFT and IFFT configuration and operation during transmit and receive intervals for the particular MIMO/SISO channel grouping. As in the case of FIGS. 5A and 5B, FIGS. 8A and 8B are simplified to show the essential processing functions required for the dual mode MIMO/SISO operation of the present device.

The transmit functions of the analog front end processor 804 include receiving baseband transmit signals from MIMO/SISO modulator/demodulator/MAC 840 for spatial stream 1 STR__1 directed to digital to analog converter 813, then to low pass filter 811, and to mixer 832 which generates a modulation output at a carrier frequency determined by the carrier selector 852 which selects one of the transmit carrier sources from carrier PLL 850. The transmit mixer 832 output is coupled to bandpass filter 830 and thereafter is coupled to power amplifier 824, which output is coupled to TR switch 820 and to antenna 812. The spatial stream processing in analog front end processors 806, 808, 810 for streams 2, 3, and 4, respectively, operates in the same manner, with each spatial stream processing performed separately from the spatial stream processing of any other analog front end processor. The reconfigurable MIMO processor 802 thereby provides the ability to simultaneously transmit and receive related or unrelated spatial streams of wireless information on the four available spatial streams STR__1 through STR__4, and these streams may be combined to form one or more MIMO channels, or used separately to form as many as four individual SISO spatial streams (one per channel), or a SISO spatial stream on one channel may be used in combination with a plurality of remaining spatial streams for MIMO on a different channel, with the resulting MIMO data stream and each SISO data stream operating concurrently and independently of the other stream. Each such independent MIMO or SISO data stream is thereby provided with a transmit and receive modulation carrier from clock selector 852. For example, in a 4×4 MIMO mode, the configuration controller 819 causes the clock selector 852 to select a single transmit and receive carrier from carrier PLL 850, which is delivered to the four analog front end processors 804, 806, 808, 810 as the transmit and receive modulation carrier source. In a 4×SISO configuration, the four analog front end processors 804, 806, 808, 810 are provided with four modulation carriers for simultaneous use on non-interfering communication channels on different frequencies, and these four modulation carriers are each coupled to a respective individual data stream STR__1, STR__2, STR__3, and STR__4. Carrier selector 852 and carrier PLL may be configured to carry only the maximum number of independent channels actually used concurrently. For example, if a single 5 Ghz band channel and a single 2.4 Ghz band channel is used, carrier select 852 would only have two input selects with carrier PLL 850 tunable to the selected channel on each respective 2.4 Ghz and 5 Ghz band, and if only a MIMO+SISO output configuration were used, only 2 carrier sources would be required from PLL 850. The transmit and receive buffers for the Media Access Controller (MAC) part of 840 may reside on separate memory which is accessed through interface bus 844, and the MAC part of reconfigurable processor 840 places received demodulated packets from each SISO or MIMO spatial stream formed by STR__1, STR__2, STR__3, STR__4 into receive buffer, and similarly handles the transfer of transmit packets from the transmit buffer accessible via interface bus 844 into the configurable processor 840 for modulation into the spatial streams STR__1, STR__2, STR__3, and STR__4. Any type of interface bus 844 may be used in the present invention, and one common type of interface bus is the well-known PCI-e (PCI Express).

Figure 8B:
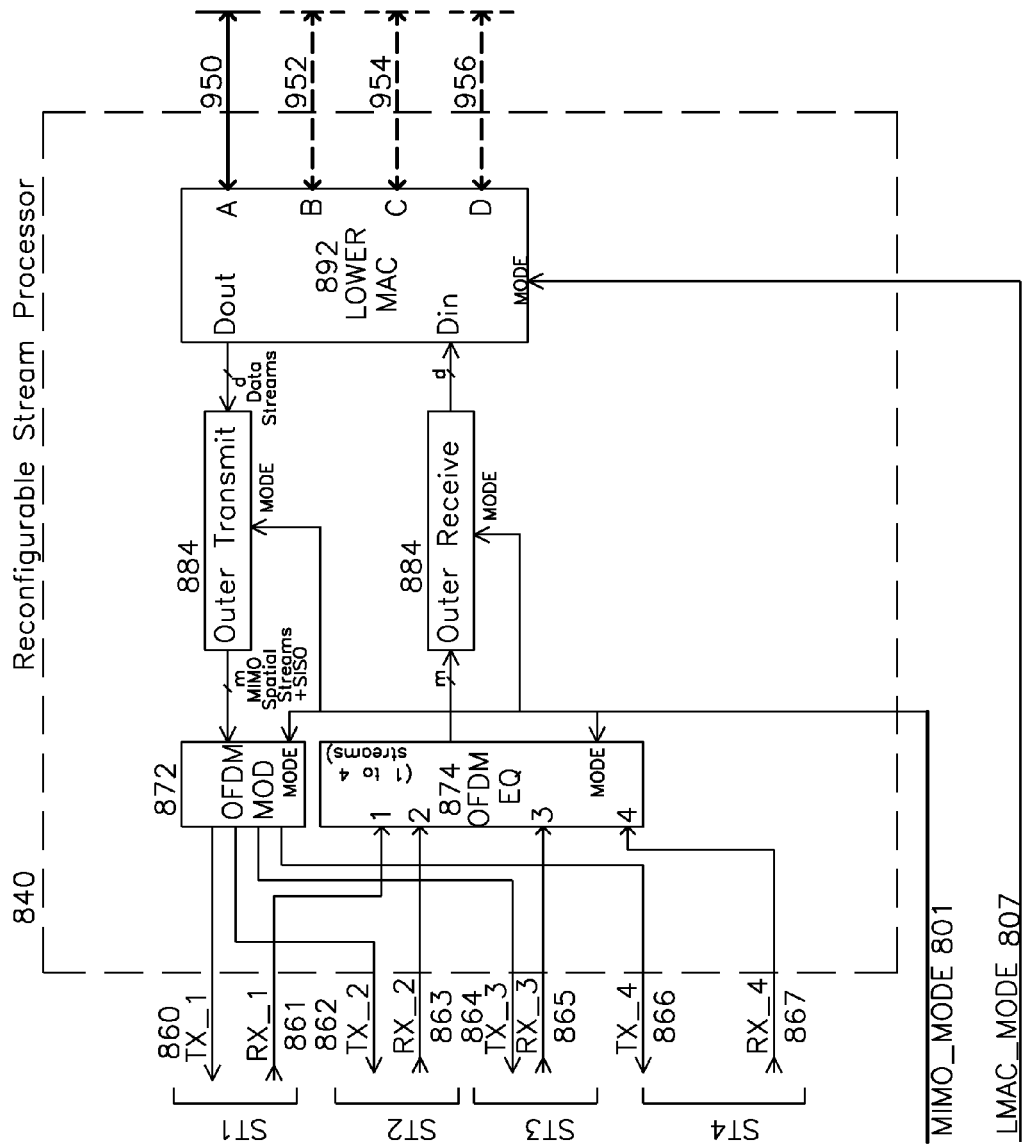
FIG. 8B is a block diagram of the reconfigurable stream processor of FIG. 8A.

Reconfigurable baseband processor 840 of FIG. 8A which includes the MIMO/SISO modulator/demodulator and MAC functions is shown in the block diagram of FIG. 8B, and is reconfigurable using MIMO_MODE input 801, which selects the various MIMO and SISO modulators and equalizers according to configuration controller 819 of FIG. 8A, as required. For a 4×4 or dual 2×2 MIMO demodulation, the four baseband receive spatial streams 861, 863, 865, 867 of FIG. 8B from the associated receive path of analog front end processors 804, 806, 808, 810, respectively, of FIG. 8A, are routed to 4×4 reconfigurable MIMO equalizer 874. MIMO equalizer 874 can operate in any of the following configurations: 4×4 MIMO, 3×3 MIMO, two 2×2 MIMO, and two SISO equalizers, with SISO equalizer 878 providing an additional two SISO equalizers, as required. In another receive example configuration, for a four channel SISO demodulator, the receive streams are directed to MIMO equalizer 874 which is operating in 2×SISO mode, and SISO equalizer 878 performs the equalization of the other two SISO spatial streams. Once the spatial streams are demodulated, the handling through outer receiver 889 is performed as was described for 620 of FIG. 5B, although since the outer receiver 889 and lower MAC 892 may be handling multiple independent data streams, context for each stream can be saved as required so that the same functional element may be re-used for each stream, either in a round-robin mode, or in a uniform bandwidth manner which provides the use of the outer receiver 889 and lower MAC 892 function across all streams which require it. For example, a de-interleaver 885 which is capable of m=1 to 4 spatial streams and four stream operation at 600 Mhz may be re-used with context storage for each spatial stream to provide four SISO data streams at 150 Mhz by interleaving the data from each spatial stream and using saved stream context for the previous operation of each of the four streams, such that each of the independent streams may be handled in different time slices by the same functional component. Similarly, de-parser 886, DePuncturer 887, Decoder 888, Descrambler 890, and lower MAC 892 may provide capacity to handle the combined aggregate stream such as a 600 Mbps 4×4 MIMO stream, and also provide context storage and multiplexing which provides for the same function to be four-way multiplexed at 150 Mhz for the four independent streams. Outer receiver 889 may operate as was described for 612 of FIG. 5B, and the detailed configurations for the outer receiver is shown in the configuration examples of FIGS. 8C-1, 8C-2, 8C-3, 8C-4, and 8C-5.

Mixed MIMO and SISO transmit data stream handling operates similarly. Lower MAC 892 provides a stream of data which is organized by the particular mode (4×SISO, two 2×2 MIMO, one SISO plus one 3×3 MIMO, one 4×4 MIMO) which is selected, and provides this to outer transmit functions 880, which include, in sequence, scrambler 891, encoder 881, puncturer 882, parser 883, and interleaver 884, which operate with stream context for each independent stream of data. Outer transmitter 880 may operate as was described for 620 of FIG. 5B, and example configurations of the outer transmitter are shown in FIGS. 8C-1, 8C-2, 8C-3, 8C-4, and 8C-5. The streams are provided to MIMO modulator (which includes two SISO modulators), and dual SISO modulators 876, which provide transmit spatial streams 860, 862, 864, 866 to the analog front end processors 804, 806, 808, 810, respectively, of FIG. 8A previously described.

Figures 1, 8C:
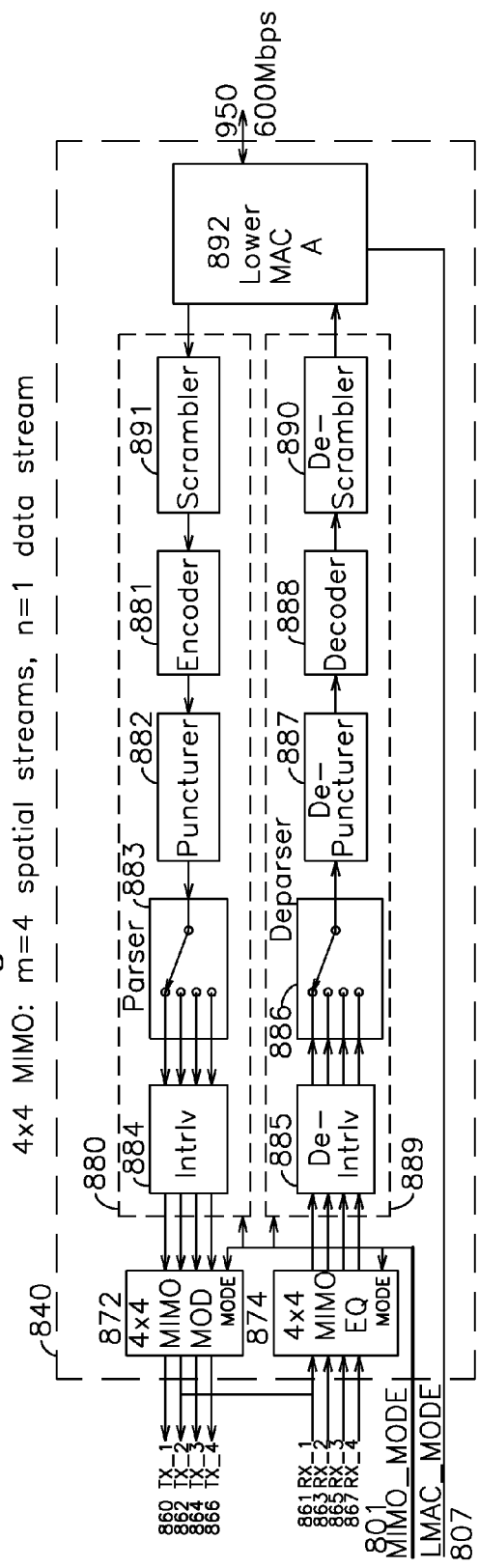
Figures 2, 8C:
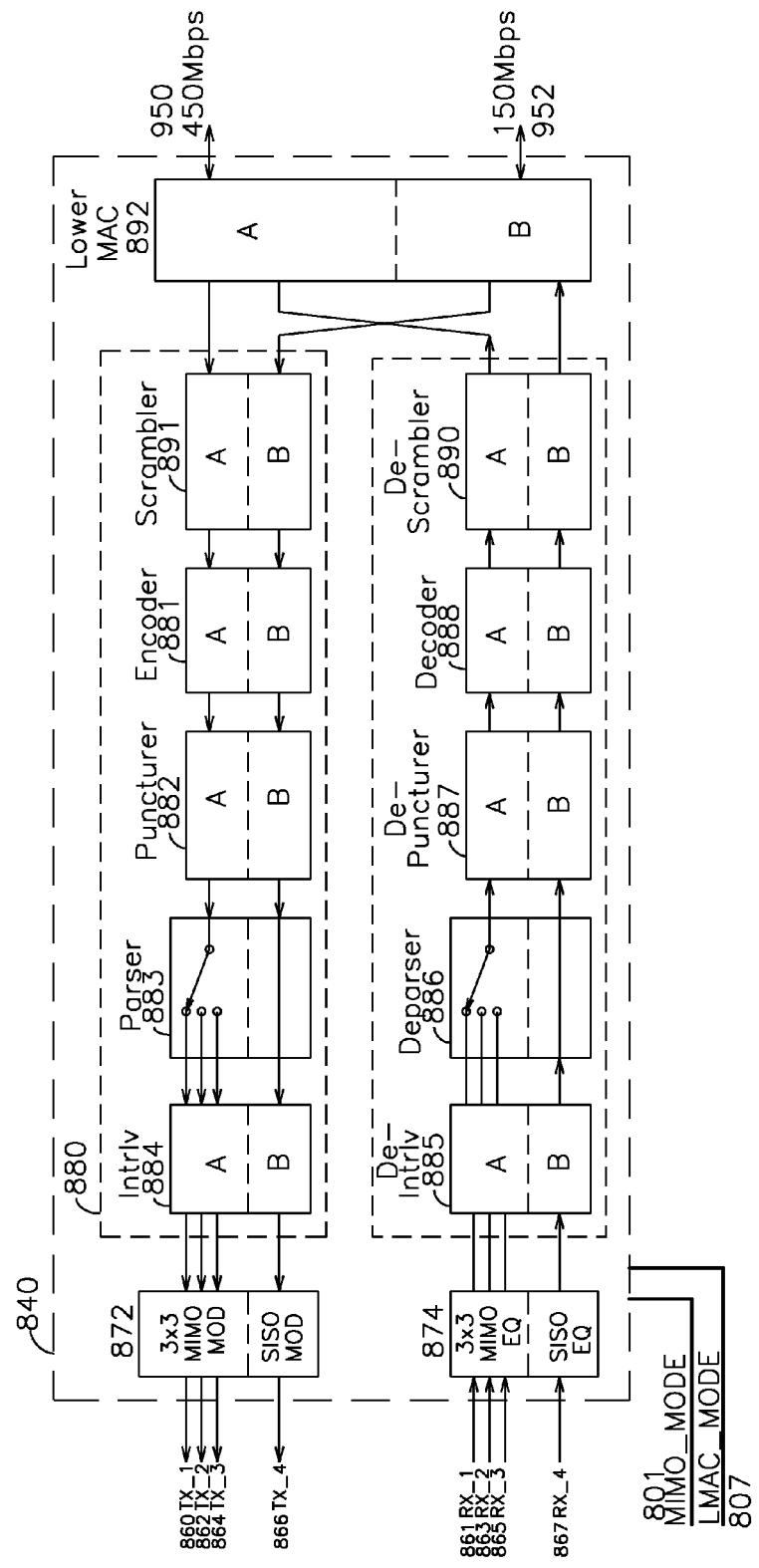
Figures 3, 8C:
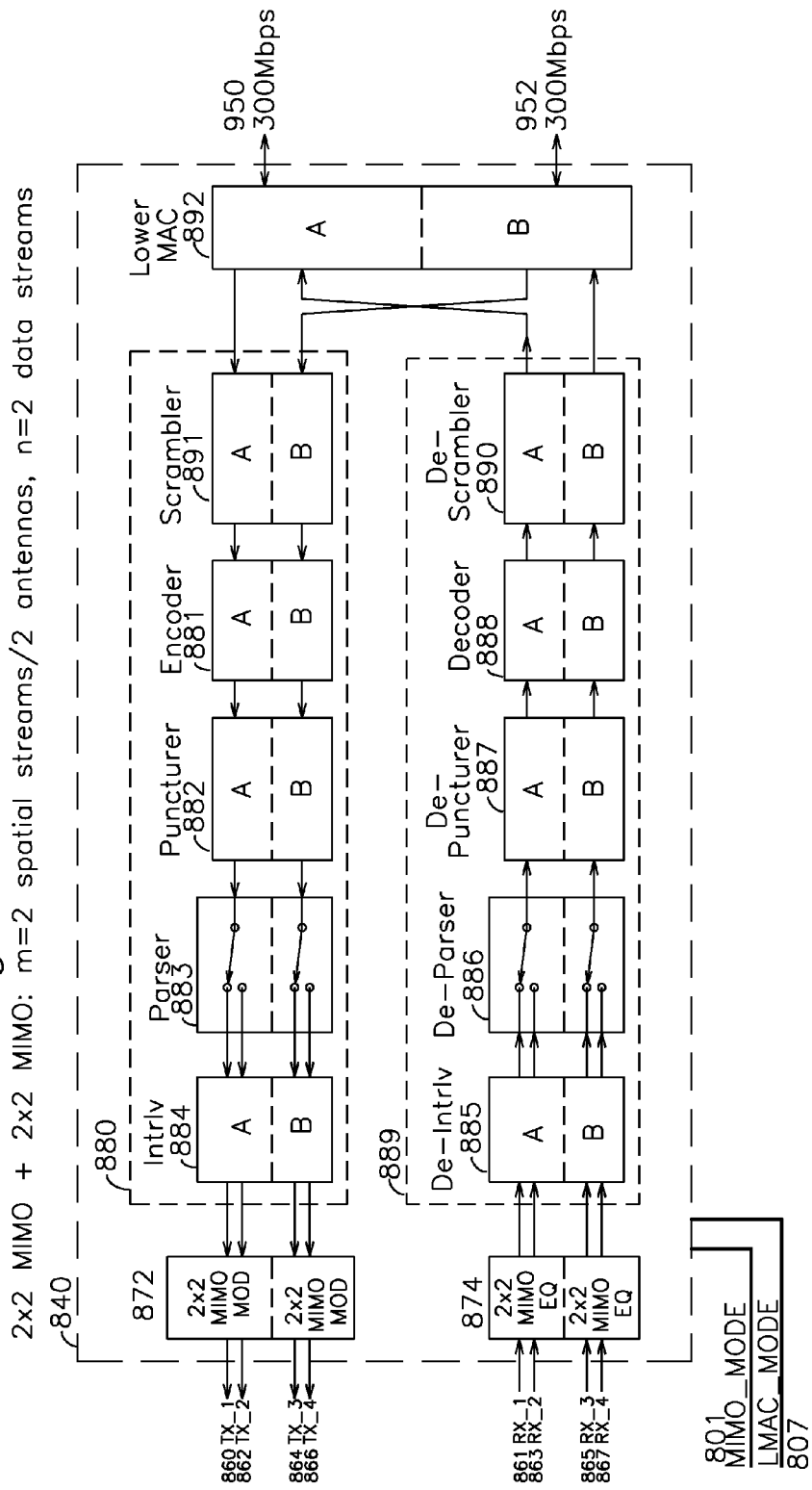
Figures 4, 8C:
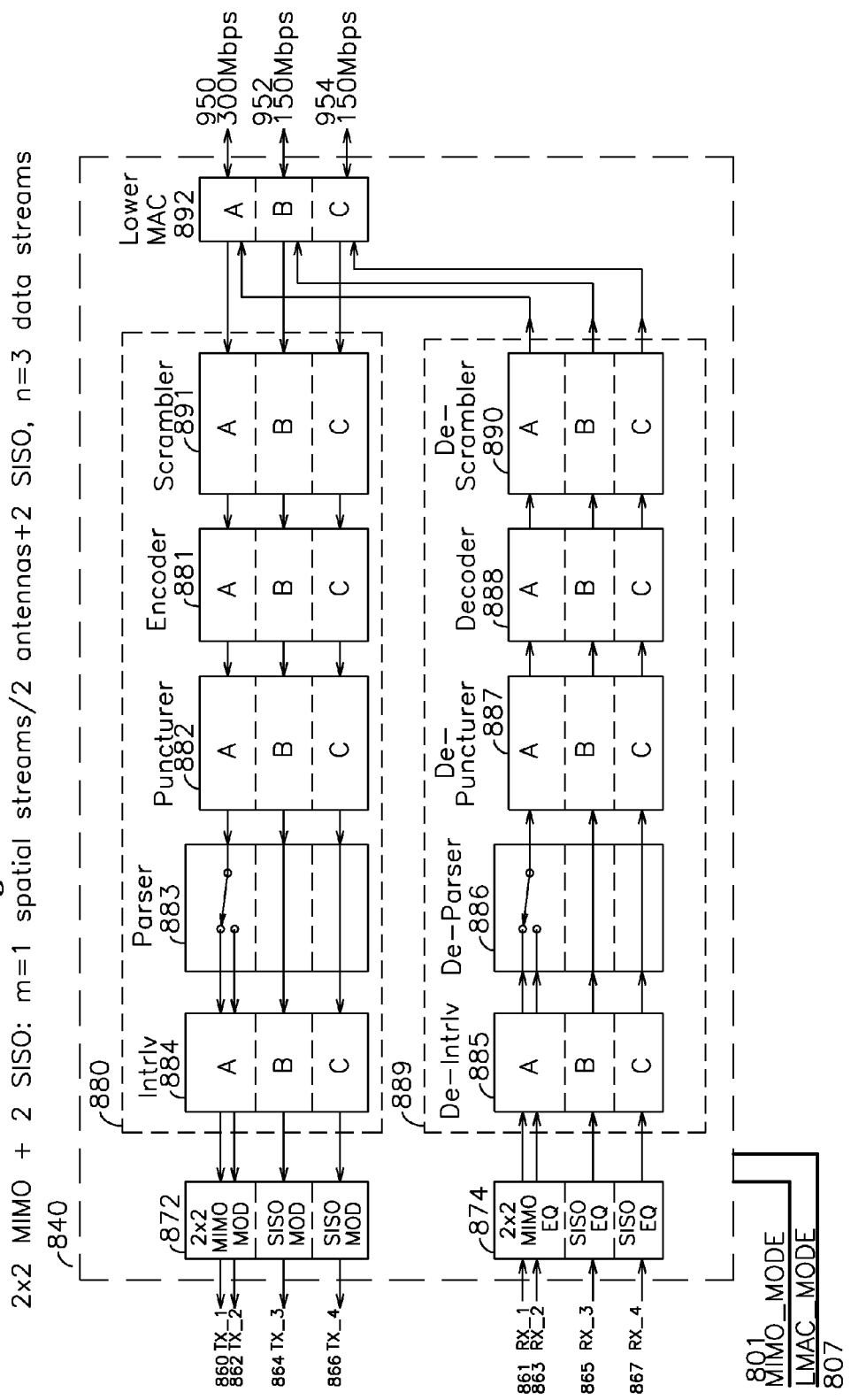
Figures 5, 8C:
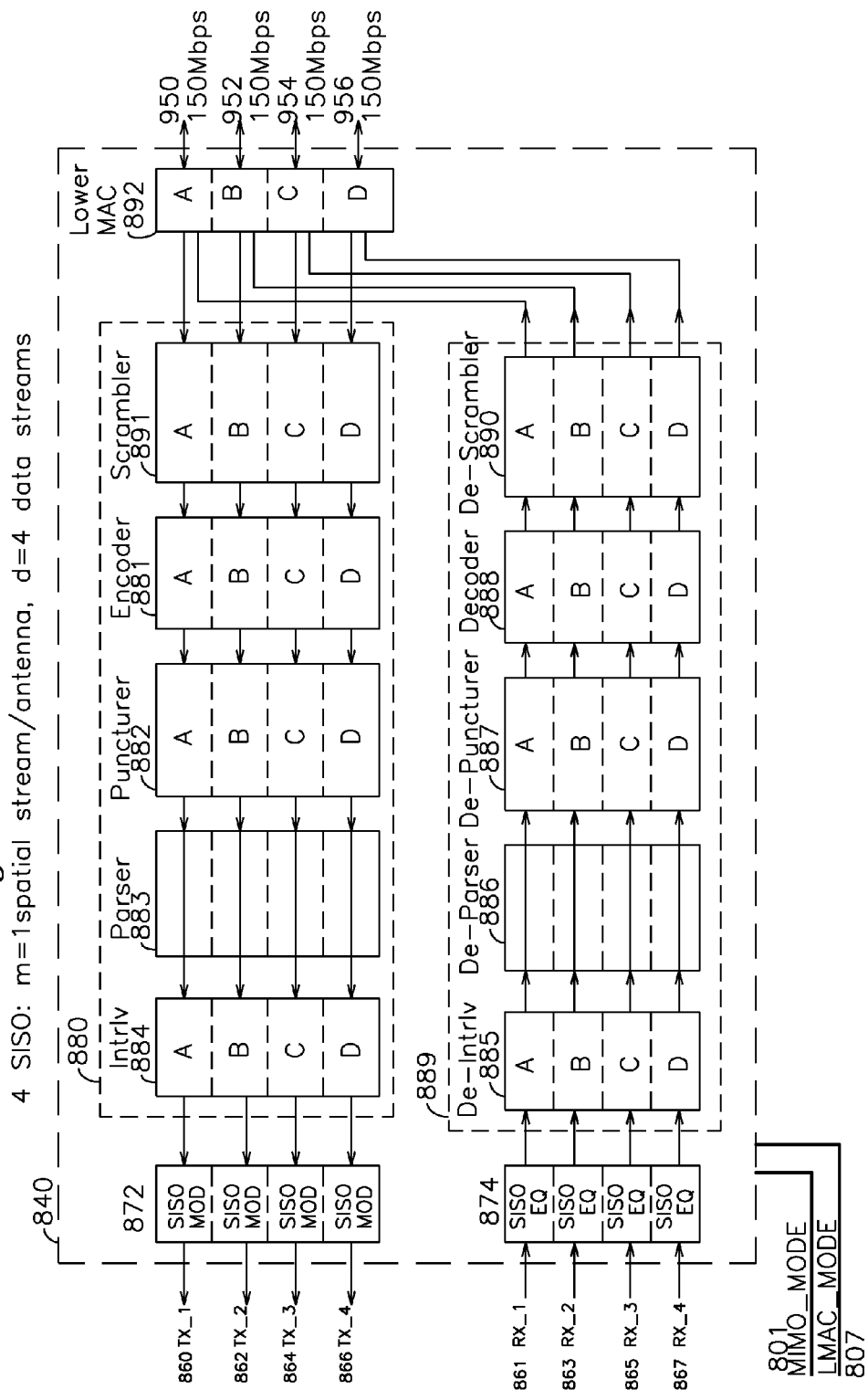
Figure 8F:
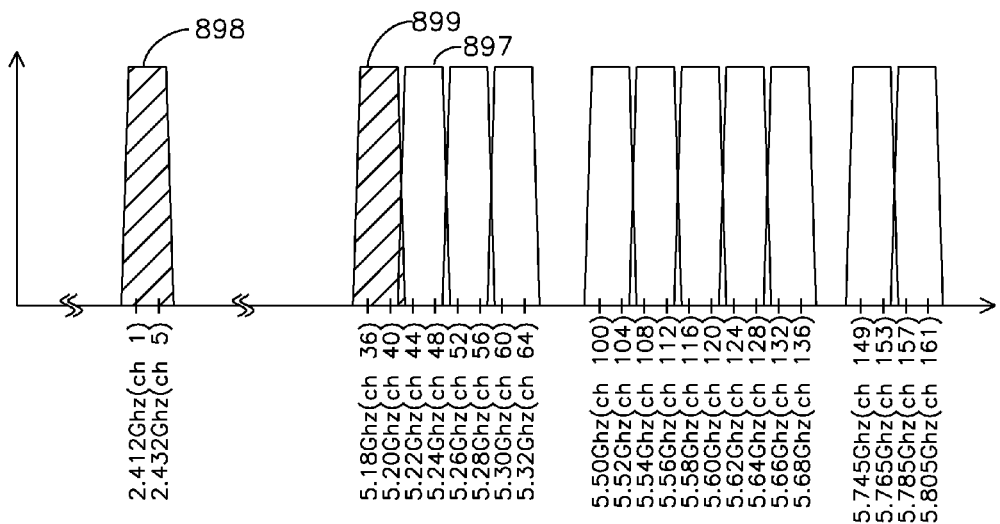
FIG. 8F shows a plot of channel spectra for use in the current invention.

FIG. 8C-1 shows a station (STA) or access point (AP) configuration for the reconfigurable processor 802 in 4×4 MIMO mode, and generating a single 600 Mbps stream of data, such as by using a 40 Mhz RF channel and QAM-64 modulation. FIG. 8C-2 shows the reconfigurable processor 802 configured for 3×3 MIMO and generating one data stream at 450 Mbps and also a 150 Mbps SISO data stream. FIG. 8C-3 shows the reconfigurable processor 802 configured for two 2×2 MIMO data streams, with each stream generating 300 Mbps. FIG. 8C-4 shows the reconfigurable processor 804 configured for a 2×2 MIMO data stream and two SISO data streams. FIG. 8C-5 shows the same reconfigurable processor 804 operating with four individual SISO data streams, each data stream with a data rate of 150 Mbps.

FIGS. 8D and 8E shows some possible reconfigurable communications processor configurations for FIGS. 8A and 8B, which are generated by configuration controller 819 of FIG. 8A and directed to the various functional blocks of FIGS. 8A and 8B.

FIG. 8F shows a mapping of 40 Mhz 802.11n channels in one example use, where a 2.4 Ghz channel 3 such as 898 may be used for a 150 Mhz SISO data channel and the 5 Ghz channel 36 899 may be used for a 450 Mhz MIMO data channel, with the analog front end processor selecting a 2.4 Ghz modulation carrier for the SISO stream associated with channel 898 and a 5 Ghz modulation carrier for the MIMO stream associated with channel 899.

Figure 9:
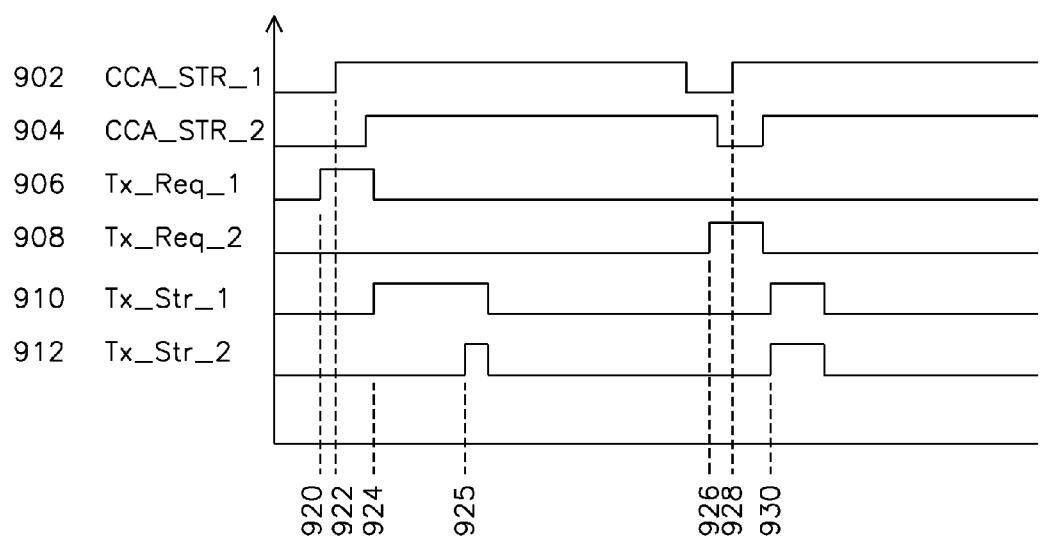
FIG. 9 shows a timing diagram for transmission request and transmission.

FIG. 9 shows another aspect of the invention as applied to the problem of multi-channel transmission with adjacent receivers which are operating on shared media in adjacent channels such as 899 and 897 of FIG. 8F where one may be receiving when the adjacent analog front end processor is transmitting, since the two communications channels are used asynchronously according to the IEEE standards and the architecture of FIGS. 8A and 8B or FIGS. 5A and 5B. During an interval when one transmitter is operating when a nearby receiver of the same reconfigurable adapter 802 is attempting to receive a stream, corruption of the adjacent receiver may occur. In one embodiment of the invention, the likelihood of adjacent channel receiver corruption is reduced when a channel assessment signal CCA is used by the transmitters of both MIMO and SISO streams, and the receiver for each channel in use provides a CCA signal to each transmitter, even if on a different channel. In the case where two transmit streams are in use on different channels, for example a first stream for MIMO and a second stream for SISO, the receiver associated with the first MIMO stream generates CCA_STR_1 902 indicating clear channel assessment on that particular channel in use, and the receiver associated with second stream generates a CCA_STR_2 904 indicating clear channel assessment of the other particular channel in use. FIG. 9 shows the case where transmission of the first SISO stream and second MIMO stream on separate channels are coordinated to occur during the same time intervals, when no other active receiver of the device is receiving wireless signals. For example, at time 920, a first stream transmit request is made during a time when CCA_STR_2 is indicating the second channel is in use from interval 920 to 924. At time 924, the first channel transmission starts, as shown by Tx_Str_1 910 and any pending packets in the second stream Tx_Str_2 912 are also optionally transmitted to complete at the same time as completion of the TX_STR_1 stream from 925 to 927, thereby avoiding the problem of the remote station acknowledging the packets transmitted during interval 925 to 927 at the same time transmitter stream 1 910 is transmitting and interfering with the receiver associated with stream 2, which would otherwise not receive the acknowledgements if the packets were sent shortly after time 924. At time 926, the second channel requests a transmission Tx_Req_2 908, although neither the first nor second channel is clear as indicated by CCA_STR_1 and CCA_STR_2 until time 930, when the transmission starts at time 930 as indicated on waveform Tx_Str_2 912.

FIG. 9 illustrates a particular use of the clear channel assessment for transmission, but the clear channel assessment may be realized a variety of different ways. For example, one embodiment transmits on a particular channel only when all possibly interfering channels are clear. In another embodiment, a characterization of interchannel corruption is made, where a measurement of incoming signal level of a receiving channel is compared to the power level and channel number which causes corruption in the receiving channel, and the transmit holdoff shown in FIG. 9 is only used when interchannel corruption would occur given the incoming signal level and channel of the receiver and transmitter. In another embodiment, the transmitters only operate during the same interval and when no receive channel is active. It should be noted that for the two channel case where one channel in use is at one of the 2.4 Ghz channels and the other is at one of the 5 Ghz channels, no transmit coordination as shown in FIG. 9 is necessary. Transmit coordination as shown in FIG. 9 is only necessary when multiple channels on the same frequency band are in use and are interfering with each other. The interference from one channel transmitting while another is receiving and both are operative on 5 Ghz channels may be mitigated through other techniques such as increased separation distance from one spatial stream antenna to another, or through transmit power management, or through close coupling of devices on a link, as was described for the PAN case of FIG. 7.

We claim:
1. A configurable network adapter comprising:
a plurality of N analog front end signal processors, each comprising a transmitter accepting an input signal, a receiver generating an output signal, and an antenna port;
said N being an integer greater than 1;
a Multiple Input Multiple Output (MIMO) equalizer having a first mode for N inputs and a second mode for less than N inputs;

a MIMO modulator having a first mode for generating N outputs and a second mode for generating less than N outputs;

a Single Input Single Output (SISO) equalizer having an input and an output;

a SISO modulator having an input and an output;

a first outer receiver coupled to said MIMO equalizer output, said first outer receiver coupled to the input of a first Media Access Controller (MAC);

a first outer transmitter coupled from the output of said first MAC to said MIMO modulator input;

a second outer receiver having an input coupled to said SISO equalizer and an output coupled to a second MAC;

a second outer transmitter having an input coupled to an output of said second MAC and an output coupled to said SISO modulator input;

where in a first mode of operation, each of said N analog front end signal processor transmitter signal inputs are coupled to one of said MIMO modulator outputs and each of said N analog front end signal processor receiver signal outputs are coupled to one of said MIMO equalizer inputs, said configurable network adapter thereby generating M streams of data for an N×M MIMO stream;

and in a second mode of operation, each of N−1 of said N analog front end signal processor transmitter signal inputs are coupled to one of said MIMO modulator outputs and an Nth said analog front end transmitter signal input is coupled to said SISO modulator output, and each of N−1 of said analog front end signal processor receiver signal outputs are coupled to one of said MIMO equalizer inputs, and the Nth receiver signal output is coupled to said SISO equalizer input, said configurable network adapter thereby generating M−1 streams of data for an (N−1)×(M−1) MIMO stream;

said MIMO equalizer and said MIMO modulator operative on N front end signal processors in said first mode and operative on N−1 analog front end signal processors in said second mode, said SISO equalizer not operative in said first mode and operative on one analog front end signal processor in said second mode.

2. The configurable network adapter of claim 1 where said N is 3.

3. The configurable network adapter of claim 1 where said N is 4.

4. The configurable network adapter of claim 1 where said N=4 and in said first mode, said MIMO equalizer is operative on at least one of a 4×4, 4×3, 4×2, or 4×1 MIMO stream, and in said second mode, said MIMO equalizer is operative on at least one of a 3×3, 3×2, or 3×1 MIMO stream.

5. The configurable network adapter of claim 1 where said N=3 and in said first mode, said MIMO equalizer is operative on at least one of a 3×3, 3×2, or 3×1 MIMO stream, and in said second mode, said MIMO equalizer is operative on at least one of a 2×2 or 2×1 MIMO stream.

6. The configurable network adapter of claim 1 where, in said second mode, said SISO modulator and said second MAC are operative for either a Personal Area Network (PAN) or Wireless Local Area Network (WLAN).

7. The configurable network adapter of claim 1 where, when N=4, in said first mode, said MIMO modulator is operative on at least one of a 4×4, 4×3, 4×2 or 4×1 MIMO stream, and in said second mode, said MIMO modulator is operative on at least one of a 3×3, 3×2, or 3×1 MIMO stream.

8. The configurable network adapter of claim 1 where, when N=3, in said first mode, said MIMO modulator is operative on at least one of a 3×3, 3×2, or 3×1 MIMO stream, and in said second mode, said MIMO modulator is operative on at least one of a 2×2 or 2×1 MIMO stream.

9. The configurable network adapter of claim 1 where, when said N−1 analog front end signal processor transmitters are operative on the same frequency channel as the remaining analog front end signal processor transmitter, and either said MIMO modulator or said SISO modulator is operative as a Personal Area Network (PAN), the analog front end signal processor transmitter associated with said PAN is operative with a reduced power level compared to the analog front end signal processor transmitter not associated with said PAN.

10. The configurable network adapter of claim 1 where said network adapter changes from said first mode to said second mode following a beacon interval during which transmit buffer queues are emptied by transmitting pending Wireless Local Area Network (WLAN) or Personal Area Network (PAN) frames.

11. The configurable network adapter of claim 1 where said network adapter is operative in said first mode during a first interval of a beacon interval and operative in said second mode during a subsequent interval of said beacon interval.

12. A configurable multi-stream Multiple Input Multiple Output (MIMO) stream processor for N channels, N being an integer greater than 2, the MIMO processor comprising:

N analog front end signal processors, each said analog front end signal processor having a transmit channel and a receive channel;

a MIMO equalizer operative in one of two modes, a first mode where said MIMO equalizer is coupled to said N receive channels, and a second mode where said MIMO equalizer is coupled to a subset N−1 of said receive channels, the Nth receive channel coupled to a SISO equalizer;

a MIMO modulator coupled to said N transmit channels in said first mode and coupled to a subset N−1 of said N transmit channels in said second mode;

a SISO modulator coupled to one of said transmit channels in said second mode;

a SISO equalizer coupled to one of said receive channels in said second mode, wherein during one segment of a beacon interval, said MIMO equalizer and said MIMO modulator are enabled and said SISO equalizer and said SISO modulator are not enabled, and during a different segment of said beacon interval, said MIMO equalizer, said MIMO modulator, said SISO equalizer, and said SISO modulator are enabled.

13. The MIMO processor of claim 12 where, in said first mode, said MIMO equalizer or said MIMO modulator is operative to generate M streams of data in an N×M MIMO mode, where said N×M MIMO mode is at least one of a 4×4, 4×3, 4×2, 4×1, 3×3, 3×2, or 3×1 MIMO mode.

14. The MIMO processor of claim 12 where, in said second mode, said MIMO equalizer or said MIMO Modulator is operative to generate M−1 streams of data from said N−1 receive or transmit channels, thereby generating an (N−1)×(M−1) MIMO stream, including in at least one of a 2×1 MIMO stream or a 2×2 MIMO stream.

15. The MIMO processor of claim 12 where said MIMO equalizer or said MIMO modulator change from said first mode to said second mode during a beacon interval.

16. The MIMO processor of claim 12 where said MIMO equalizer or said MIMO modulator is operative according to IEEE Wireless Local Area Network (WLAN) Standard 802.11n.

17. The MIMO processor of claim 12 where said SISO equalizer or said SISO modulator is operative as either a Wireless Local Area Network (WLAN) or a Personal Area Network (PAN).

18. The MIMO processor of claim 12 where said SISO equalizer is periodically operative during an interval of said second segment and polling for a WLAN device that may be present.

\* \* \* \* \*